US006475064B2

(12) United States Patent
Hao et al.

(10) Patent No.: US 6,475,064 B2
(45) Date of Patent: Nov. 5, 2002

(54) MULTIPOINT BENDING APPARATUS FOR LAPPING HEADS OF A DATA STORAGE DEVICE

(75) Inventors: Shanlin Hao, Eden Prairie; Lars Halvar Ahlen, Bloomington; Edward Michael Erickson, Apple Valley, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/892,039

(22) Filed: Jun. 26, 2001

(65) Prior Publication Data

US 2001/0051491 A1 Dec. 13, 2001

Related U.S. Application Data

(63) Continuation of application No. 09/020,549, filed on Feb. 9, 1998, now Pat. No. 6,287,170, which is a continuation-in-part of application No. 08/765,139, filed on Dec. 13, 1996, now Pat. No. 5,951,371.
(60) Provisional application No. 60/050,134, filed on Jun. 27, 1997.

(51) Int. Cl.[7] .......................... B24B 49/00; B24B 51/00
(52) U.S. Cl. ............................ 451/5; 451/41; 451/279; 29/593
(58) Field of Search ............................ 29/603.12, 593, 29/603; 324/226; 451/28, 11, 1, 10, 5, 9, 41, 259, 272, 273, 177, 276, 389, 279, 446, 285, 287, 289

(56) References Cited

U.S. PATENT DOCUMENTS

| | | | |
|---|---|---|---|
| 3,821,815 A | 6/1974 | Abbott et al. | 360/110.2 |
| 4,457,114 A | 7/1984 | Hennenfent et al. | 51/216 R |
| 4,471,579 A | 9/1984 | Bovensiepen | 51/165.73 |
| 4,477,968 A | 10/1984 | Kracke et al. | 29/603 |
| 4,517,041 A | 5/1985 | Hennenfent et al. | 165/155 |
| 4,536,992 A | 8/1985 | Hennenfent et al. | 51/109 R |
| 4,559,743 A | 12/1985 | Kracke et al. | 51/165 R |
| 4,675,986 A | 6/1987 | Yen | 29/603 |
| 4,689,877 A | 9/1987 | Church | 29/603 |
| 4,850,157 A | 7/1989 | Holmstrand | 51/128 |
| 4,891,914 A | 1/1990 | Pierrat | 51/105 R |
| 4,912,883 A | 4/1990 | Chang et al. | 51/165 R |
| 4,914,868 A | 4/1990 | Church et al. | 51/165.71 |
| 5,023,991 A | 6/1991 | Smith | 29/603 |

(List continued on next page.)

OTHER PUBLICATIONS

"Use of Microelectronic Test Structures to Characterize IC Materials, Processes, and Processing Equipment", by G. p. Carver e al., Electron Devices Division, National Bureau of Standards, Washington, D. C.*

MSL315 Multiple Station Lapping System for Thin–Film or MR Recording Heads, To Total Automation, Inc.*

Primary Examiner—Timothy V. Eley
(74) Attorney, Agent, or Firm—Westman, Champlin & Kelly, P.A.

(57) ABSTRACT

An actuator adapted to adjust the profile of a carrier supporting a bar relative to a lapping surface. The carrier including a plurality of spaced control or actuation points along the length of the carrier for adjusting the profile of the mounting surface of the carrier adapted to support a bar for lapping. The actuator adapted to actuate the carrier at the spaced actuation points and including a plurality of actuation members movably actuated via pressure supplied to the actuation members. The actuation members are supported in spaced staggered relation in chambers in a manifold for bidirectional actuation. The actuation members are spaced relative to the spaced actuation points and are supported relative to the manifold to provide precision actuation for incrementally adjusting the profile of the carrier.

27 Claims, 17 Drawing Sheets

U.S. PATENT DOCUMENTS

| | | | |
|---|---|---|---|
| 5,095,613 A | 3/1992 | Hussinger et al. | 29/603 |
| 5,117,589 A | 6/1992 | Bischoff et al. | 51/216 |
| 5,175,938 A | 1/1993 | Smith | 33/567 |
| 5,203,119 A | 4/1993 | Cole | 51/165.77 |
| 5,317,837 A | 6/1994 | Stahli | 51/165.77 |
| 5,333,314 A | 7/1994 | Masai et al. | 395/600 |
| 5,335,458 A | 8/1994 | Stoffers et al. | 51/317 |
| 5,361,547 A | 11/1994 | Church et al. | 451/5 |
| 5,386,666 A | 2/1995 | Cole | 451/5 |
| 5,452,166 A | 9/1995 | Aylwin et al. | 360/126 |
| 5,463,805 A | 11/1995 | Mowry et al. | 29/603 |
| 5,478,270 A | 12/1995 | Cuomo et al. | 451/5 |
| 5,494,473 A | 2/1996 | Dupuis et al. | 451/1 |
| 5,525,091 A | 6/1996 | Lam et al. | 451/1 |
| 5,597,340 A | 1/1997 | Church et al. | 451/5 |
| 5,607,340 A | 3/1997 | Lackey et al. | 451/5 |
| 5,620,356 A | 4/1997 | Lackey et al. | 451/5 |
| 5,695,387 A | 12/1997 | Moravec et al. | 451/56 |
| 5,713,123 A | 2/1998 | Toyoda et al. | 29/603.12 |
| 5,951,371 A * | 9/1999 | Hao | 451/28 |
| 6,287,170 B1 * | 9/2001 | Hao et al. | 451/5 |

* cited by examiner

MULTIPOINT BENDING APPARATUS FOR LAPPING HEADS OF A DATA STORAGE DEVICE

This application is a Continuation Application of U.S. application Ser. No. 09/020,549, now U.S. Pat. No. 6,287,170 filed Feb. 9, 1998 and entitled "MULTIPOINT BENDING APPARATUS FOR LAPPING HEADS OF A DATA STORAGE DEVICE which is a Continuation-In-Part application Ser. No. 08/765,139 entitled "MULTI-POINT BENDING OF BARS DURING FABRICATION OF MAGNETIC RECORDING HEADS" of Shanlin Hao, filed Dec. 13, 1996 now U.S. Pat. No. 5,951,371 which claims benefit of Provisional Application Ser. No. 60/050,134 filed Jun. 27, 1997 and entitled MULTI-POINT BENDING SYSTEM FOR ULTRA-PRECISION MACHINING.

BACKGROUND OF THE INVENTION

The present invention relates to a lapping system for manufacturing heads of a data storage system. In particular, the present invention relates to an improved lapping system for controlling the sensor height for transducer elements along a bar forming a plurality of heads.

Heads of a data storage system are fabricated on a common substrate (also called the wafer) by depositing a plurality of layers onto the surface of the substrate to form an array of transducers by known deposition techniques. The substrate or wafer is cut to separate rows of transducers to form a plurality of bars having a plurality of transducers spaced therealong. Each bar is lapped or machined to a desired sensor height (throat height for inductive-type transducers or stripe height for magnetoresistive ("MR") transducers"). Lapping refers to a process of removing material from the surface of the bar which will form the air bearing surface ("ABS"). Sensor height generally refers to the relation between the air bearing surface and the sensor elements of the transducers formed on a face of the head.

Head size is decreasing and the number of heads formed along a transducer bar is increasing. Because of decreasing head size, it is desirable to provide increasing manufacturing tolerance control for heads to assure optimum performance of a disc drive. A transducer bar is supported by a carrier relative to a lapping surface to machine a lower surface of the bar to a desired sensor height. Electronic lapping guides ("ELG") are located along the bar to control sensor height along the entire length of the bar. Prior lapping systems bent or adjusted the profile of the carrier to compensate for dimension variations along the length of the bar. With decreasing head size, it is desirable to provide more accurate profile adjustments to the carrier to more closely correspond to dimension variations of the bar.

SUMMARY OF THE INVENTION

The present invention relates to an actuator adapted to adjust the profile of a carrier supporting a bar relative to a lapping surface. The carrier includes a plurality of spaced control or actuation points along the length of the carrier for adjusting the profile of the mounting surface of the carrier adapted to support a bar for lapping. The actuator is adapted to actuate the carrier at the spaced actuation points. The actuator includes a manifold supported relative to the carrier. The manifold supports a plurality of actuation members in spaced staggered relation relative to spaced actuation points. The actuation members are movably actuated via pressure supplied to the actuation members and are supported relative to the manifold to provide precision actuation for incrementally adjusting the profile of the carrier.

DETAILED DESCRIPTION OF THE PREFERRED EMBODIMENTS

The present invention relates to an apparatus for lapping a bar to a desired sensor height for transducers formed along the bar (i.e. inductive-type transducers or MR transducers). Heads are fabricated from a wafer (not shown) having an array of transducers deposited on the face of a substrate by known thin film deposit techniques. Rows of transducers are separated from the wafer to form a bar 10 including a plurality of spaced transducers 12, shown in FIG. 1, which are separated to form individual heads 14.

Figure 1:
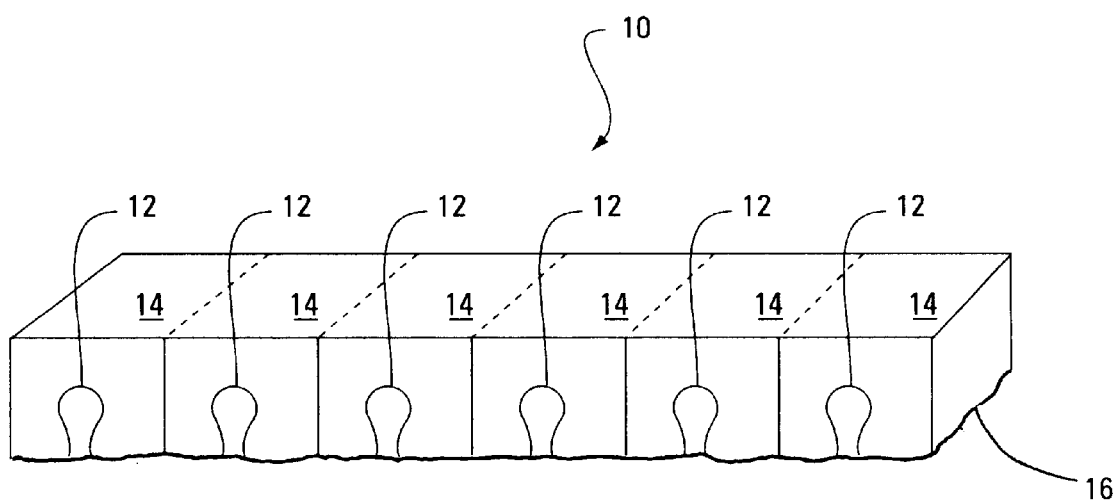
FIG. 1 is a perspective view of a bar, having a plurality of transducers spaced therealong, which is cut to form separate heads.

An air bearing surface ("ABS') 16 is formed perpendicular to the sensor elements of the transducers 12. Prior to forming the ABS, the surface is lapped, to remove material from the surface to provide a desired height (i.e. sensor height) between the ABS surface 16 and the sensor elements of the transducers 12 as is known. As illustrated in FIG. 1, surface 16 of bars 10 may be uneven so that the distance between the surface and sensor elements varies. This uneven surface profile may be introduced during the wafer fabrication process, or while the wafer is sliced to form bars 10. During the lapping process, the bar 10 is secured to a carrier which is supported relative to an abrasive lapping surface. Sensor height variations may be introduced due to an uneven abrasive lapping surface or mounting induced thermal stress variations introduced by securing the bar to a carrier.

Figure 2:
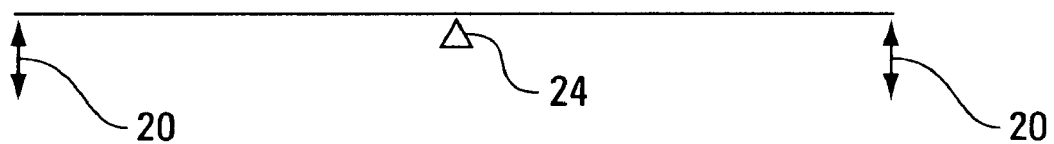
FIG. 2 is a prior art bending diagram for bending a carrier to alter the profile of the carrier.
Figure 3:
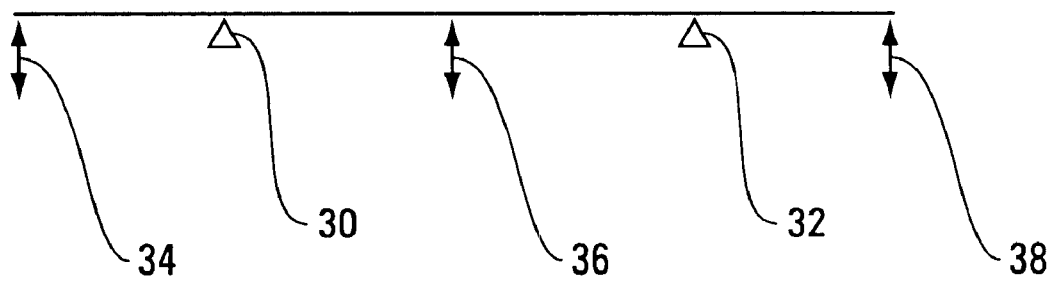
FIG. 3 is a prior art bending diagram for bending a carrier to alter the profile of the carrier.

To compensate for sensor height variations during the lapping process, the profile of the carrier may be adjusted as illustrated by load diagram of FIG. 2. Arrows 20 and 22 represent actuators or load points at either end of the carrier and fulcrum 24 represent a fixed portion of the carrier. The load diagram shown in FIG. 2 may be accomplished by the carrier and actuator illustrated in U.S. Pat. No. 4,457,114, issued Jul. 3, 1984. Thus, a carrier bent as shown in FIG. 2, provides limited control of the carrier profile for adjusting for sensor height variations along the length of the bar 10 during the lapping process. FIG. 3 is another prior art load diagram which includes fixed control points or fulcrums 30, 32 and actuators which control actuated control points represented by bidirectional arrows 34, 36, 38.

One aspect of the present invention includes the recognition that there are two parameters which must be controlled during lapping. The parameters are bending of the bar profile and balancing of the force applied to the bar. Bending of the bar refers to adjusting the profile of the bar such that the bar becomes relatively straight (or is otherwise shaped as desired). Another aspect of the present invention includes the recognition that the use of additional control points on a carrier can be used to provide more accurate control of a bar during a lapping process. The present invention includes determination of the number of control points needed to achieve a desired length. For example, given a bar bending profile defined by I bars defined by J data points, $x_{ij}$, $y_{ij}$ where i=1, 2, . . . I, and j=1, 2, . . . J. A polynomial curve fit function is formed using a least squares fit analysis:

$$\bar{y}_{ij} = f(a_1, a_2 \ldots, a_k, x_{ij}) \qquad \text{Eq. 1}$$

where k equals 2, 3, . . . and is the order of the curve and a, $a_2$, . . . are the coefficients of the curve.

Next, the root mean square (RMS) of the residuals for each k are calculated according to the following formula:

$$RMS_k = \sqrt{\frac{1}{IJ-1} \sum_{i,j} (y_{ij} - \bar{y}_{ij})^2} \qquad \text{Eq. 2}$$

Using Equation 2, the number of control points (k) required to achieve the desired amount of control can be determined by assuming that a $(k-1)^{th}$ order curve can be bent straight and setting $RMS_k$ to the desired minimum variation in the bar profile. One can then calculated the necessary order of the RMS curve fit which also provides the number of control points. For example, if $RMS_k$ is less than 1 μinch Equation 2 is solved with k equal to 10. This analysis has been verified experimentally using carriers having five control points over a 1 inch long bar having a width of 0.08 inches and thickness of 0.018 inches. The standard deviation of the 1 inch long bar was 1.0 μinches. This leads to the conclusion that nine control points is sufficient to obtain a variation of less than 1 μinch in the finished bar profile for a standard 2 inch long bar. Table 1 shows that between 9 and 10 control points are needed to achieve control to with in 1 μinch in a 2 inch bar.

TABLE 1

| Curve Fit Parameter | RMS of residuals between individual point and curve on each bar | | | | RMS over 15 × 24 | STD measure = 1.67 |
|---|---|---|---|---|---|---|
| # | mean | median | 75% | 90% | points | μinch |
| 2 | 39.3 | 33.44 | 60.28 | 72.85 | 46.67 | 46.64 |
| 3 | 19.8 | 13.59 | 27.57 | 46.91 | 25.13 | 25.07 |
| 4 | 8.96 | 6.54 | 10.96 | 18.78 | 11.4 | 11.28 |
| 5 | 6.06 | 4.48 | 6.54 | 9.63 | 7.5 | 7.31 |
| 6 | 4.67 | 3.39 | 5.77 | 8.63 | 5.6 | 5.35 |
| 7 | 3.21 | 2.57 | 3.82 | 7.26 | 3.62 | 3.21 |
| 8 | 2.56 | 2.23 | 2.97 | 4.66 | 2.82 | 2.27 |
| 9 | 2.09 | 2.02 | 2.61 | 2.98 | 2.19 | 1.42 |
| 10 | 1.69 | 1.62 | 2.01 | 2.78 | 1.74 | 0.49 |

Figure 4:
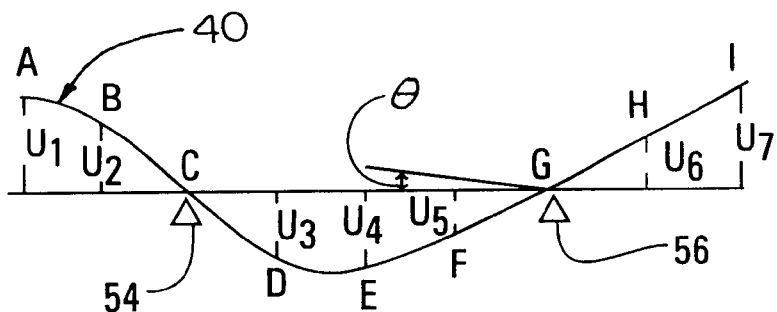
FIG. 4 is a diagram illustrating a carrier profile displacement actuated according to an embodiment of the present invention.

FIG. 4 is a schematic diagram of a bending profile for a carrier in accordance with one embodiment of the present invention. Carrier is shown with bending profile 40 having control points A, B, C, D, E, F, G, H and I. Control or load points A, B, D, E, F, H and I are coupled to actuators (not shown in FIG. 4) while control points C and G are stationary fulcrums 54 and 56, respectively. In FIG. 4, control point A is shown actuated a distance of $U_1$, control point B is shown actuated distance $U_2$, control point D is shown actuated distance $U_3$, control point E is shown actuated distance $U_4$, control point F is shown actuated a distance $U_5$, control point H is shown actuated a distance $U_6$ and control point I is shown actuated a distance $U_7$. Thus, there are nine separate control points shown in FIG. 4 of which seven are individually actuated and two are fixed. This provides eight different segments to profile 40 which can be controlled, segments A–B, B–C, C–D, D–E, E–F, F–G, G–H and H–I. The slope Θ of a line passing through control points C and G can be used to control balance of carrier and the distribution of the lapping force across the carrier. During operation, the actuators which couple to points A, B, D, E, F, H and I are preferably controlled such the slope is a substantially straight line.

Figure 5:
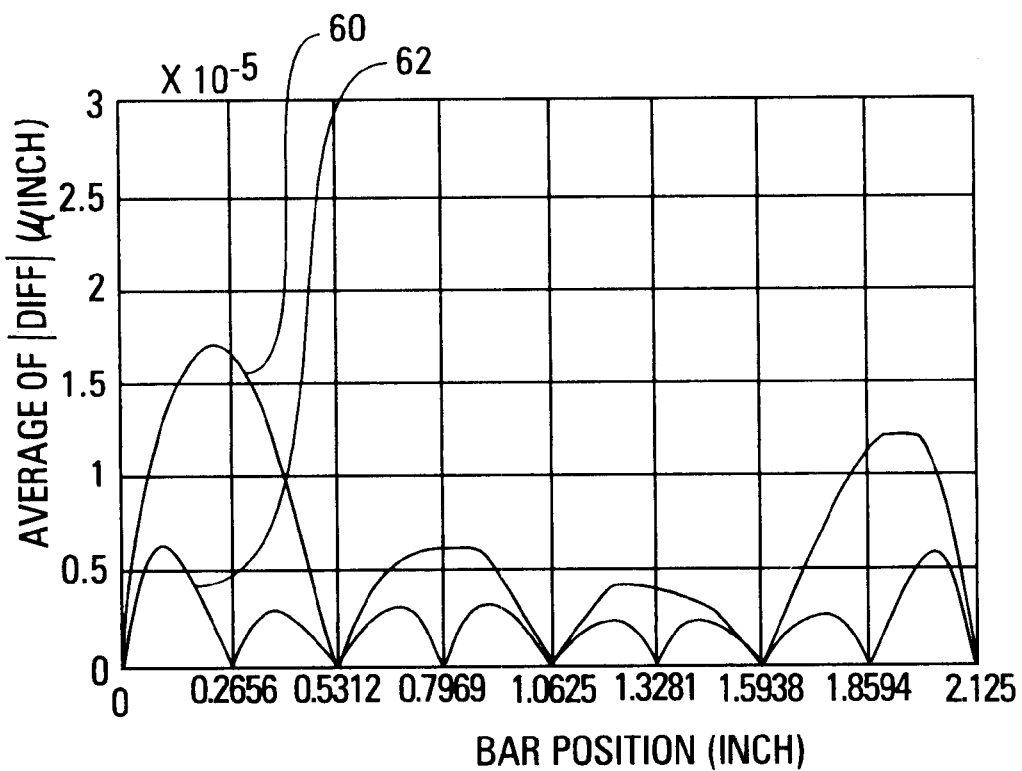
FIG. 5 is a graph showing deflections for the carrier of FIG. 3 and the carrier of FIG. 4.

FIG. 5 is a comparison of deflection using a prior art three-point bending carrier such as shown in FIG. 3 and a seven-point bending carrier such as shown in FIG. 4. FIG. 5 is a graph showing the average difference between a deformed carrier shape and a bar bow at various positions along the length of the bar. Line 60 is for a three-point carrier and line 62 is for a seven-point carrier. The graph of FIG. 5 was calculated using a finite element method ("FEM") modeling technique. As shown in FIG. 5, the three-point bending allows substantial variation to the profile, particularly between the end point actuators or load points (i.e., between 30 and 34 and between 32 and 38, shown in FIG. 3.).

Figure 6A:
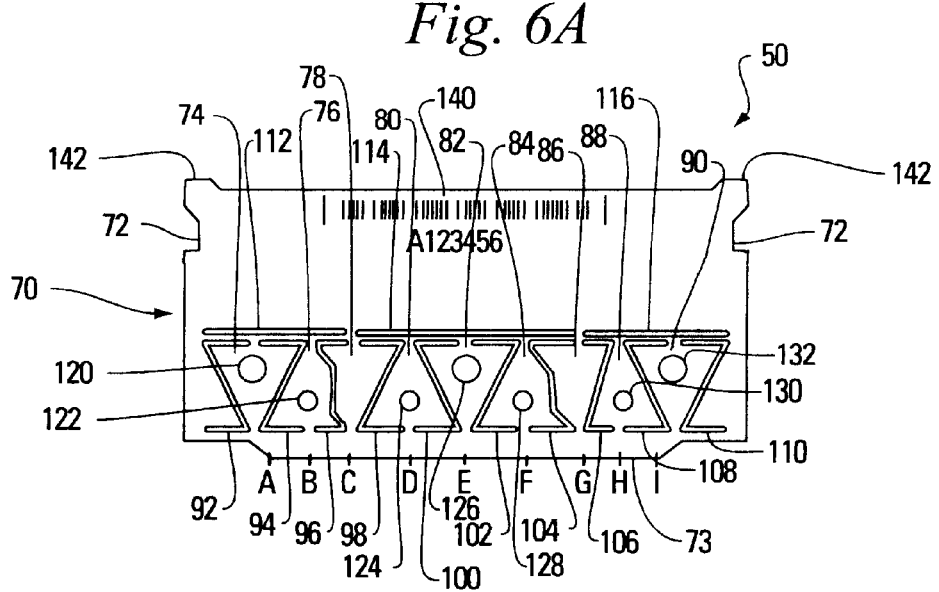
FIG. 6A is a front plan view.
Figure 6B:
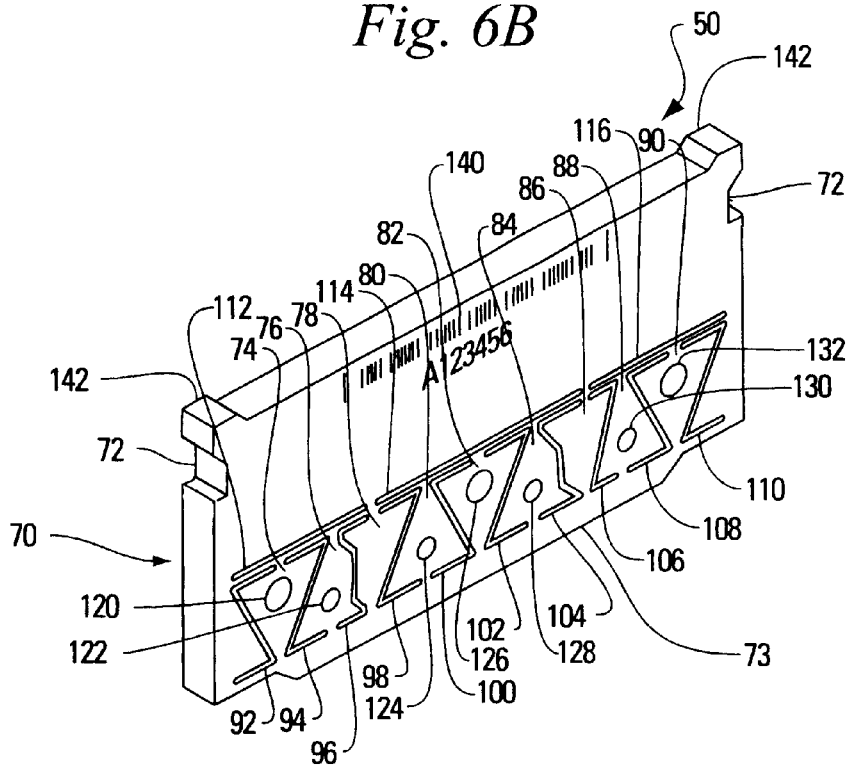
FIG. 6B is a top perspective view, respectively, of a carrier and according to one embodiment of the invention having nine control points.

FIG. 6A is a front plan view and FIG. 6B is a top perspective view of an embodiment of a carrier 50 for multiple point actuation. Carrier includes main body 70 having detents 72 formed therein. Bars 10 are coupled to mounting surface 73, the profile of which varies via actuation of control points A–I. Profile 40 includes control points A–I. Nine control areas 74, 76, 78, 80, 82, 84, 86, 88 and 90 are formed in main body 70 adjacent control points A–I, respectively. Control areas 74–90 are defined by regions of reduced strength in main body 70 formed by cutouts 92, 94, 96, 98, 100, 102, 104 106, 108 and 110. Further, plate spring cutouts 112, 114 and 116 are positioned parallel to and opposite fulcrum 54, 56 or control point C and G. Actuator couplings 120, 122, 124, 126, 128, 130 and 132 are positioned within control areas 74, 76, 80, 82, 84, 88 and 90, respectively. Main body 70 may also optionally carry bar code information 140. The design of carrier 50 in FIGS. 6A and 6B is selected based upon the design goal of balancing structure bending stiffness while achieving the desired bar bow correction requirements based upon available bending capacity (load and travel) of the actuators.

In operation, actuators (not shown in FIGS. 6A and 6B) are adapted to couple to actuator couplings 120–132 to control the profile 40 as desired. Using control area 74 as an example, cutouts 92 and 94 allow vertical movement which is transferred to control point A. Furthermore, control area 78 controls control point C. The cutout portions 92–110 have a shape selected to reduce the coupling to adjacent control areas. However, control area 78 is more closely coupled to main body 70 because of the spacing between parallel spring cutouts 112 and 114. This is also true for control area 86 with respect to cutouts 114 and 116. Thus, control areas 78 and 86 provide stationary control points or fulcrums 54 and 56, respectively, shown in FIG. 4. Another aspect of the present invention is the vertical offset between adjacent actuator couplings 120 and 122, for example. This offset allows the actuator couplings to be more closely spaced thus allowing additional control points and therefore greater control. Further, cutouts 96 and 104 are staggered to further improve spacing. Plate spring cutouts 112, 114 and 116 provide a plate spring parallel mechanism which yields more linear bending on the bar and reduces off-plane displacement due to the lapping force or an off center bending force. Cutouts 112, 114 and 116 reduce the amount of twisting motion which could be imparted to carrier 50 due to the lapping force of the lapping surface as it is moved past carrier 50.

Another aspect of the present invention includes the use of non-uniform spacing between control points in order to improve control or more evenly distribute control. For example, referring back to FIG. 5, the deflection between the two end points in graph 62 indicates that the maximum variation occurs between points A and B and points H and I. Therefore, rather than uniformly distributing the control points, the design of FIGS. 6A and 6B has reduced spacing between side control points (i.e., sections A–B, B–C, G–H and H–I) than that of the middle control points (i.e, sections C–D, D–E, E–F and F–G). This spacing may be adjusted as appropriate to achieve either a uniform distribution or any desired distribution. Detents 72 are used to clamp carrier 50 to the arm of the lapping device. Registration sections 142 provide a reference surface for the lapping arm during the lapping process. In one preferred embodiment, carrier 50 is formed of white TZP Zirconia ceramic which allows for easy maintenance. The bar code 140 can be used to track carrier 50 and/or an associated bar during the machining process.

Figure 7:
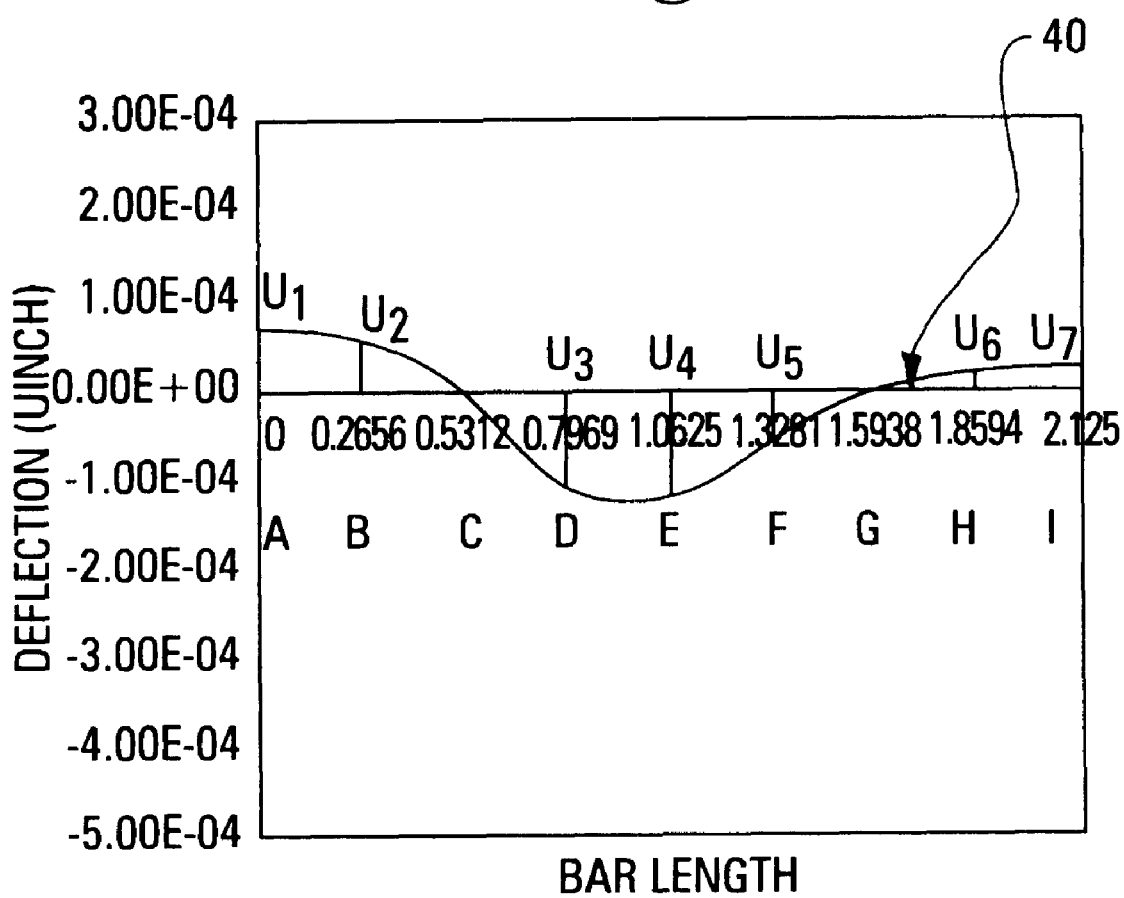
FIG. 7 is a diagram illustrating deflection versus position of a carrier in accordance with the present invention.

One aspect of the present invention includes characterizing the carrier for subsequent use during the lapping process. FIG. 7 is a graph based upon FEM modeling which shows the response of a deflection profile 40 when point D is actuated through actuator coupling 124. FIG. 7 is a graph of deflection versus bar length. FIG. 7 shows that the individual bending control points are closely coupled together in the present invention. Note that this is in contrast to the prior art designs shown in FIGS. 2 and 3 in which the points are spaced further apart and each actuated control point is separated by a fixed control point. Thus, in the present invention, the movement of a single control point significantly alters the entire profile of the carrier. Therefore, in order to actively control the bending of the bar during the lapping process, an accurate transfer function must be determined which describes the carrier response to different loading situations. This transfer function may be defined as a matrix. Assume that:

$\bar{F}=[F1, F2, \ldots F7]$ is the applied bending forces on the carrier 50 at each control point; and $\bar{U}=[U1, U2, \ldots U7]$ is the resulting displacement of surface 73 (profile 40) for each of the control points A–I, respectively.

A sensitivity matrix $\bar{K}$ can be generated according to the formula:

$$\bar{K} \cdot \bar{F} = \bar{U}2 \qquad \text{Eq. 3}$$

where:

$$K = \begin{matrix} k11 & k12 & k13 & & k17 \\ k21 & k22 & & & k27 \\ k31 & & & & \\ & & \ldots & & \\ k71 & k72 & & & k77 \end{matrix}$$

The sensitivity matrix $\bar{K}$ defines the behavior of surface 73 (profile 40) in response to forces applied at each of the actuator coupling points 120–132. The major diagonal components in K describe the direct effect of forces applied at individual bending points. The off-diagonal components in $\bar{K}$ describe the coupling effect between the various points.

The sensitivity matrix $\bar{K}$ can be established by quantifying the carrier displacement response to individually applied known bending forces. This may be performed either through actual experimental measurements or using FEM modeling techniques. During the lapping process, the equation is solved in reverse. First, the normalized bar bow profile is formed using ELG feedback information. The profile of the bar is leveled using balancing of the fixed control points. The carrier deflection required to bend the bar straight is calculated in accordance with the equation:

$$\bar{U}=[U1, U2, \ldots U7] \qquad \text{Eq. 5}$$

Where U1–U7 represent a flat profile. Next, equation 3 is solved for F:

$$\bar{F}=[F1, F2, \ldots F7] \qquad \text{Eq. 6}$$

Where F1–F7 are the forces which must be applied by each actuator to achieve the desired profile described by $\bar{U}$.

Figure 8:
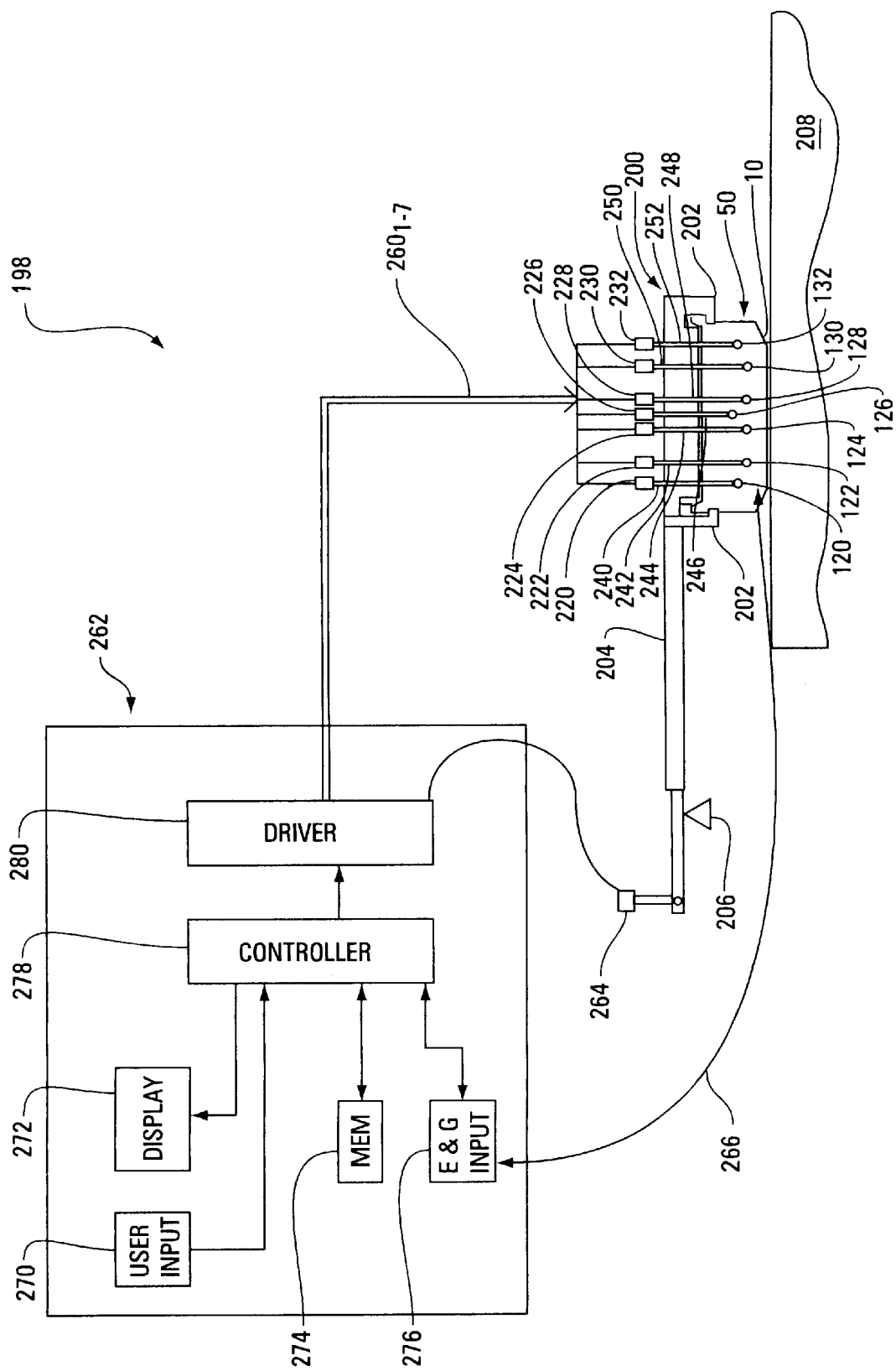
FIG. 8 is a simplified diagram of a lapping system in accordance with the present invention.

FIG. 8 is a simplified diagram showing a lapping system 198 in accordance with the present invention. Lapping system 198 includes armature 200 having clamps 202 which are adapted to clamp to carrier 50 at detents 72. Armature 200 is carried on elongated arm 204 which couples to fulcrum 206. Armature 200 is positioned whereby bar 10 which couples to carrier 50 is in contact with a lapping surface 208 (Abrasive surface) of a lapping disc. Armature 200 carriers actuators 220, 222, 224, 226, 228, 230 and 232 which couples to couplings 220–232 through actuator armatures 240, 242, 244, 246, 248, 250 and 252, respectively. Actuators 220–232 are independently operated to bend carrier 50 to achieve a desired lapping profile as previously explained as illustrated by lines $260_{1-7}$ coupled to control system 262. Armature 200 also couples to balancing actuator 264 which is positioned opposite carrier 50 relative to fulcrum 206. Actuator 264 also couples to control system 262. A feedback connection 266 is provided from electronic lapping guides (ELGs) carried on bar 10. Control system 262 includes a user input 270, such as a keypad, a user output 272, such as an LED display, memory 274, ELG input 276 a controller 278, such as a microprocessor, and an actuator driver.

In operation, the lapping process is controlled by control system 262. Controller 278 retrieves instructions and parameters from memory 274. For example, the matrix of Equation 4 may be stored in memory 274. Instructions and information are received from user input 270 and the status of the lapping process may be displayed on display 272. Additionally, lapping system 198 may include a bar code reader (not shown) to read bar code information 140 for use by controller 278. Feedback regarding the progress of the lapping operation is received through ELG input 276 and provided to controller 278. Controller 278 solves Equation 3 for $\bar{F}$ and responsively controls actuators 220–232 and 264 using driver 280. Driver 280 may comprise, for example, a transistor circuit providing a power output to actuate the actuators. Actuators 220–232 and 264 may be any appropriate actuator which is capable of providing a controlled movement such as a hydraulic system, a voice coil, a pneumatic actuator, a piezo electric system, thermal, magnetoresistive, etc. Those skilled in the art will recognize that the present invention is not limited to any particular actuator. Actuator 264 is used to provide a balance control to balance distribution of the force applied to bar 10. Actuators 220–232 are used to apply the individual forces of vector $\bar{F}$. The total amount of force applied on bar 10 may be controlled by a weight or another actuator (not shown). As shown in FIG. 8, lapping system 198 provides a closed loop in which the output from the ELG sensors are used as feedback by controller 278 to control actuators 220–232 and 264. Lapping surface 208 may comprise, for example, a rotating disc. The lapping system of FIG. 8 is provided as an example only and the carrier of the present invention may be employed with lapping systems of any appropriate design.

Figure 9:
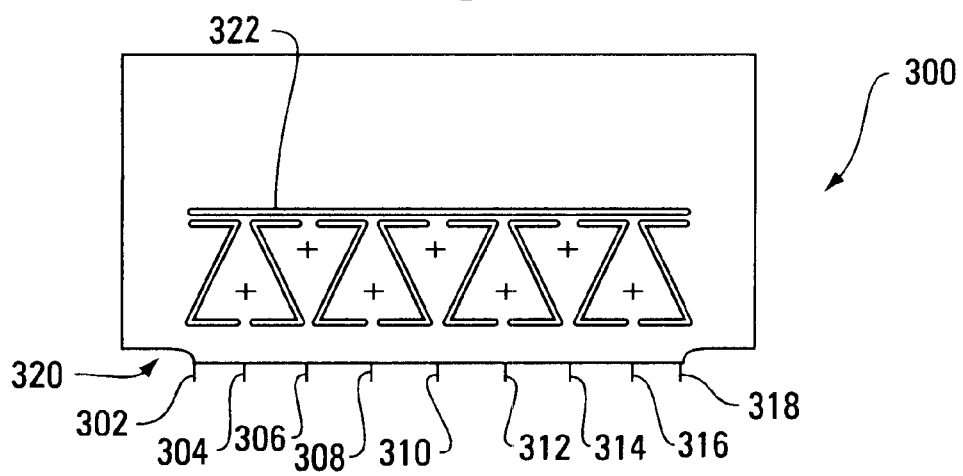
FIG. 9 is a front plan view of a carrier in accordance with another embodiment having seven adjacent actuated control points and six control points on either end of a carrier.

FIG. 9 is a plan view of a carrier 300 in accordance with another embodiment. Carrier 300 provides control points 302, 304, 306, 308, 310, 312, 314, 316 and 318 along profile 320. Carrier 300 is an example of a carrier in accordance with the present invention in which end points 302 and 318 are fixed while control points 304–316 are all individually actuated. Note that this also uses a single cutout 322 to provide the parallel spring mechanism.

Figure 10:
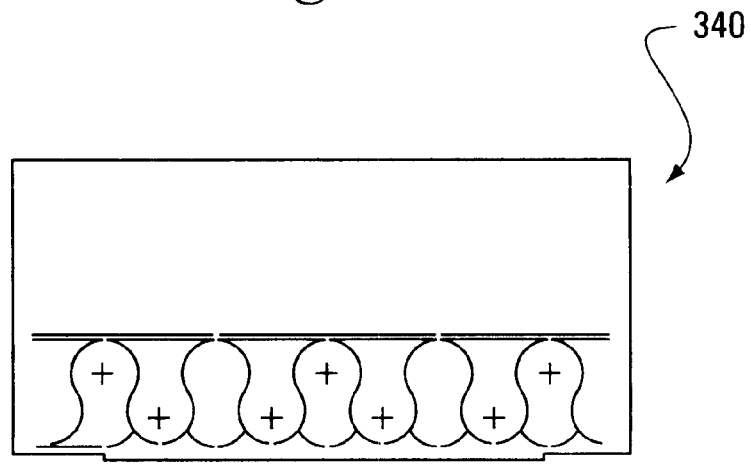
FIG. 10 is a front plan view of a carrier in accordance with another embodiment.

It will be understood that any appropriate orientation of cutouts or other mechanisms to allow relative movement of the control points is within the scope of the present invention. FIG. 10 shows a plan view of a carrier 340 which illustrates another technique for selecting the shape of cutouts in the carrier body. The cutouts in carrier 340 are designed to reduce deflection of the carrier profile due to lapping pressure. Carrier 340 accomplishes this goal by contouring the beam of the cutout. Additionally, the thickness of carrier 340 can be increased to further reduce lapping induced deflection.

The present invention provides a lapping system having a carrier which allows improved control of the bending of a bar during a lapping process. The present invention includes numerous features including an increased number of actuators and closer spacing between actuators. Further, in contrast to prior art designs, in the present invention actuators are placed adjacent one another without an intermediate fixed region. Further, in the present invention, the actuator mechanism is placed on the arm of the lapping machine such that the mechanism need not be placed on each bar. Attachment of the bar to the carrier may be through any appropriate technique. In one embodiment, the bar may be slid into a slot carried on the profile of the carrier. Further, the actuators of the present invention may be used to either push or pull the bar and thereby allow deformations in either direction. Preferably, bending of the bar is centered around the normal profile of the bar. This reduces any extra bending stress placed on the bar during lapping. In one preferred embodiment, the lapping of a 2-inch long bar is controlled to within a standard deviation of less than 1 $\mu$inch using a minimum of nine separate control points, seven for bending and two for balancing the lapping force. This number may be increased or decreased as appropriate, based upon the length of the bar and the desired minimum standard deviation. Clamping of the carrier may be through any appropriate technique and is not limited to the specific clamps described herein. Further, the actuators may be coupled to the carrier using other techniques. As used herein, the term "control point" may be either a fixed control point (shown as a fulcrum in the schematic drawings) or an actuated control point.

Figure 11:
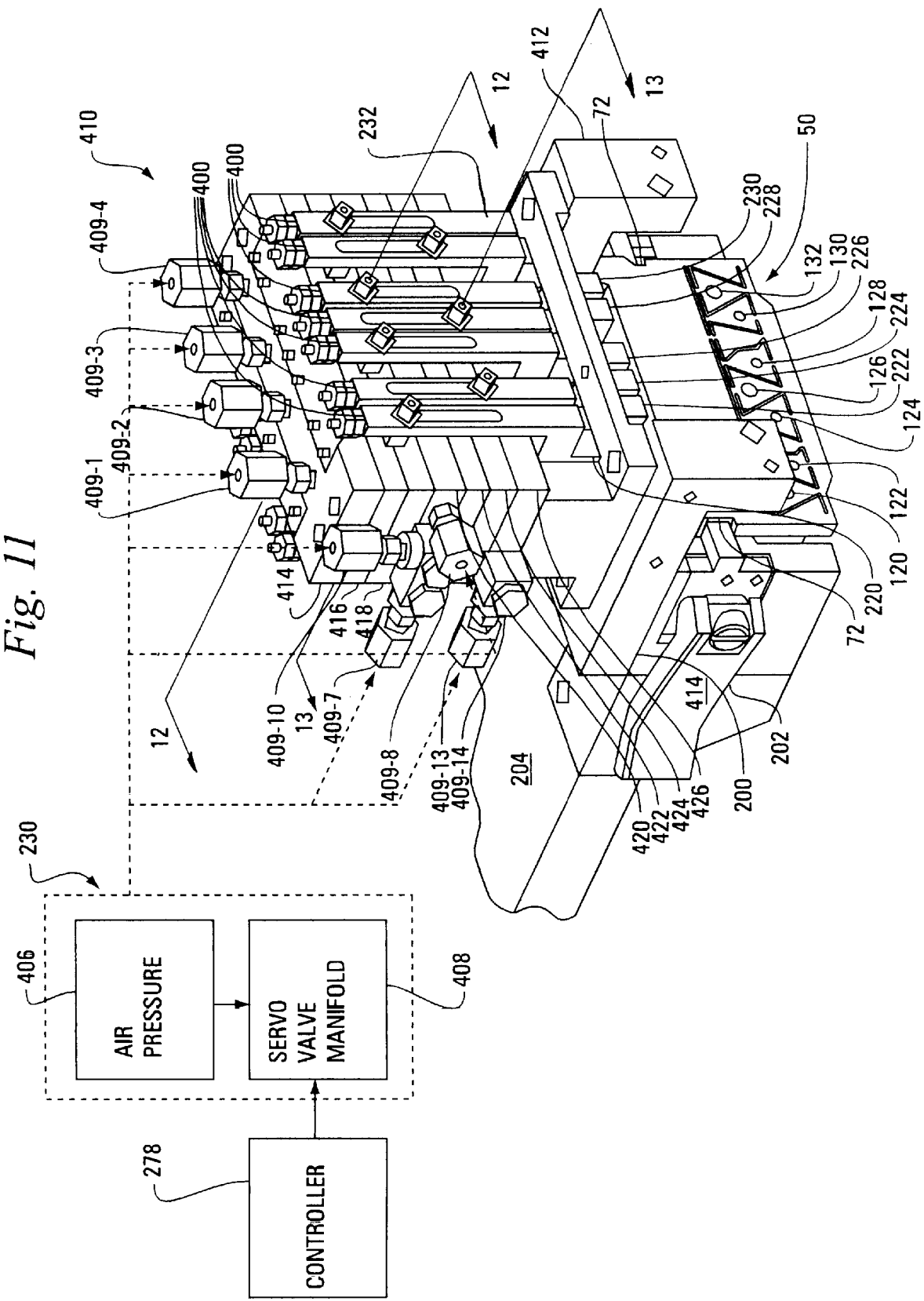
FIG. 11 is a partial perspective view of an actuator device for supplying actuation force at control points along the length of the carrier.
Figure 12:
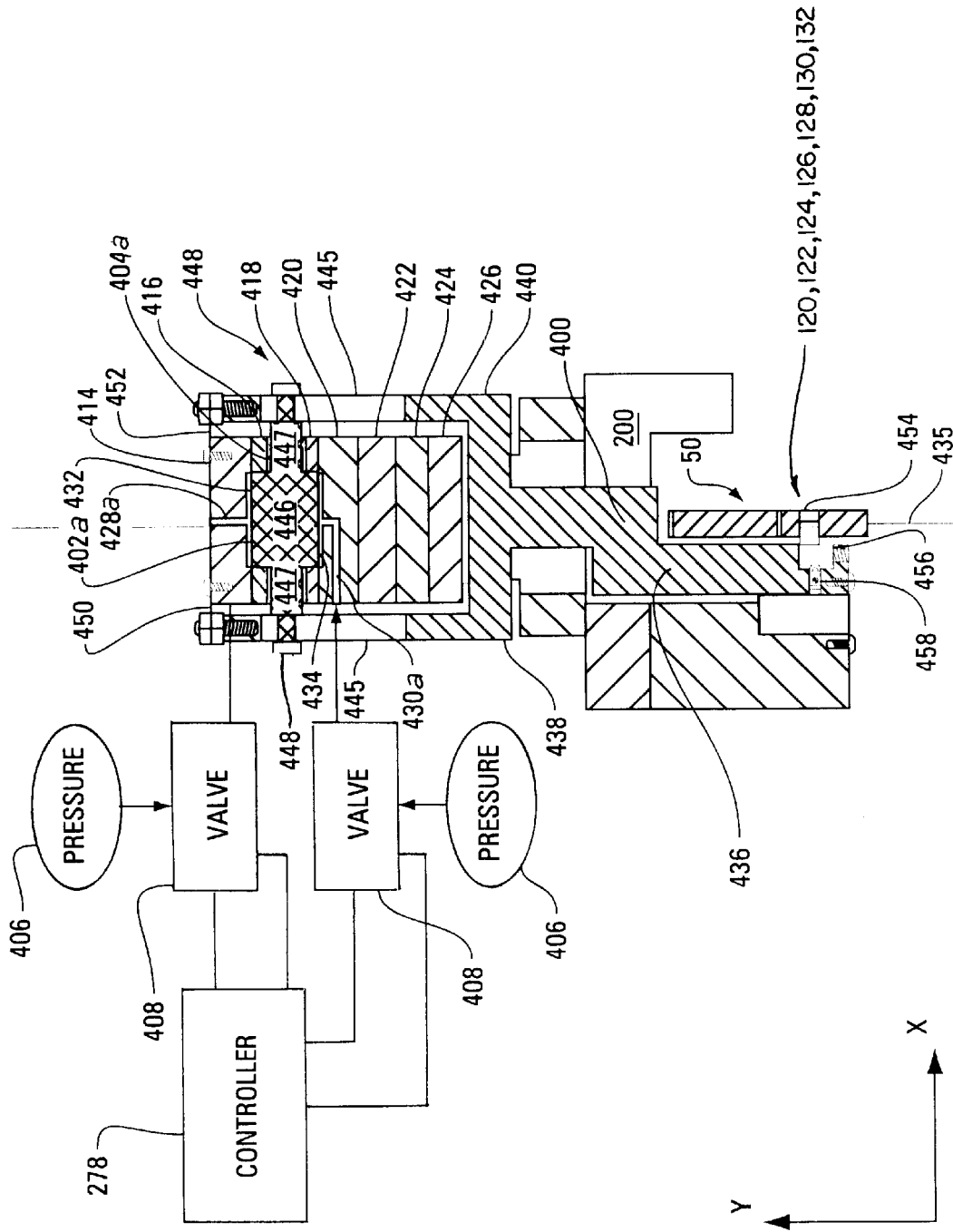
FIG. 12 is a cross-sectional view taken along lines 12—12 of FIG. 11.
Figure 13:
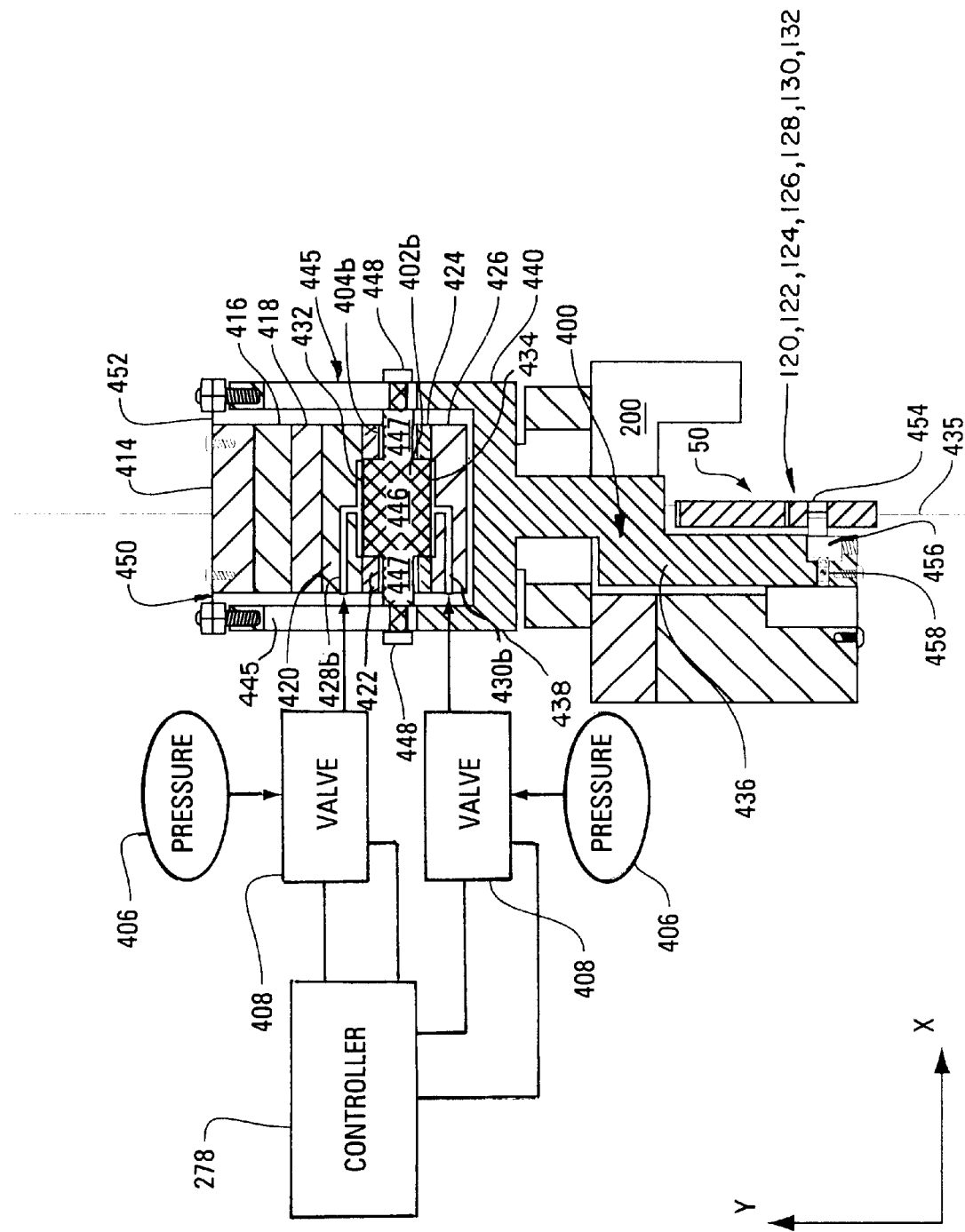
FIG. 13 is a cross-sectional view taken along lines 13—13 of FIG. 11.

FIGS. 11–13 illustrate an embodiment of carrier actuators 220–232 which couple to carrier 50 at couplings 120–132. As shown, carrier actuators 220–232 are operated via driver 280 coupled to controller 278. Carrier actuators 220–232 are preferably pneumatically operated by driver 280. Carrier actuators 220–232 include actuator rods 400 (or actuator armatures 240, 242, 244, 246, 248, 250, 252) separately operated by individual pistons 402 (not visible in FIG. 11) movable within piston chambers 404 (not visible in FIG. 11). Driver 280 includes an air pressure supply 406 and supply valve assembly 408 for selectively supplying a desired amount of air pressure to operate pistons 402 for desired bending of the carrier 50 at the control points to control the lapping process. Operation of the supply valve assembly 408 is coupled to controller 278 which calculates the desired force required at couplings 120–132 to achieve the desired profile, as previously explained. The controller 278 operates the supply valve assembly 408 to supply the desired quantity of air pressure via ports 409 to operate pistons 402 within piston chambers 404 to actuate carrier 50 through actuator rods 400. Pistons 402 are operable in separate piston chambers 404 formed in actuator manifold 410. Actuator manifold 410 is supported by base 412 operably coupled to armature 200 of a lapping system as shown in FIG. 8.

As shown in FIG. 11, carrier 50 is removably coupled to armature 200 via cooperation of opposed clamps 202 on armature 200 and detents 72 on carrier 50. FIG. 11 illustrates an embodiment of clamps 202. As shown, clamp 202 includes a clamp lever 414 which actuates clamp 202 to selectively engage and disengage detents 72 for loading and unloading a desired carrier 50. The length of the carrier 50 corresponds to the length of bar 10.

As previously explained, to provide accurate profile adjustments, multiple bending or actuation points are spaced along the length of the carrier 50. Since multiple bending or actuation points are positioned along the length of the carrier 50 to provide a more precision carrier profile as previously explained, the actuator rods 400 are closely spaced in alignment with the carrier 50. The chambers (not shown in FIG. 11) are formed in manifold 410 in spaced staggered relation to define upper- and lower-tier chambers for actuating rods 400 coupled to pistons operable therein. Manifold 410 is formed of a plurality of layers of blocks 414, 416, 418, 420, 422, 424, 426 which are stacked to formed the spaced staggered chambers as will be explained.

FIGS. 12 and 13 are sectional views taken along lines 12—12 and 13—13 of FIG. 11 illustrating the spaced staggered upper-tier chambers 404a and lower-tier chambers 404b. Upper chambers 404a are formed in block layers 414, 416, 418 and 420 and the lower-tier chambers 404b are formed in block layers 420, 422, 424, 426. Actuation pressure is supplied to upper- and lower-tier chambers 404a–b to raise and lower pistons 402 via channels 428a–b, 430a–b coupled to pressure supply 406 via ports 409. In particular, pressure is supplied to channel 428a to lower piston 402a and pressure is supplied to channel 430a to raise piston 402a; pressure is supplied to channel 428b to lower piston 402b; and pressure is supplied to channel 430b to raise piston 402b for bidirectional bending of carrier 50. Pistons 402a–b are actuated via opposed actuation (or operating) surfaces 432, 434 aligned with channels 428, 430.

The manifold 410 is supported in alignment with carrier 50 so that the pistons are center aligned with carrier 50 as illustrated by axis 435. In the embodiment illustrated, rods 400 are formed of a "yoke"-like structure having a stem 436 coupled to carrier 50 via couplings 120–132 and spaced arms 438, 440 coupled to opposed sides of pistons 402 perpendicular to actuation surfaces 432, 434. Thus, the pistons 402 are aligned between arms 438, 440. Stem 436 is aligned relative to arms 438, 440 and piston 402 to raise and lower rods 400 along a longitudinal actuation axis (y-axis) for precision bidirectional actuation.

The center alignment of the piston eliminates out-of-plane bending of the rod 400 which may influence the longitudinal displacement (along the y-axis) imparted to the rod 400. Variations in actuator distance of rods 400 affects the precision of the bending profile of the carrier 50. In particular, if the pistons 402 operate off-centered relative to carrier 50, rotational as well as translational movement may be imparted to rods 400 or other linkage members, thus degrading y-axis carrier displacement for adjusting the profile of the mounting surface 73 for compensating for sensor height variations. The spaced staggered relation of the chambers 404a–b formed in manifold 410 facilitates center alignment of actuators with carrier 50 for securing rods 400 to carrier 50.

Arms 438, 440 include an elongated slotted portion 445. The length of the arms 438, 440 extend from stem 436 to connect to the upper and lower pistons 402 and the extent of the elongated slotted portion 445 is sufficient to align with both upper- and lower-tier pistons for coupling upper and lower pistons 402 to rods 400. Pistons include a main portion 446 and extensions 447 extending from opposed sides of the piston 402 to connect piston 402 to arms 438, 440. Pins 448 extend through the elongated slotted portions 445 at selected locations to connect rods 400 to the extensions 447. Springs 450, 452 couple arms 438, 440 to manifold 410 to restrict out-of-plane motion of the rod 400 which may be introduced by unbalanced motion of the piston 402 in chamber 404. Stem 436 of rod 400 is coupled to carrier 50 via pin 454. Pin 454 is movably actuated in recess 456 via screw 458 for selective insertion into actuator couplings 120–132 of carrier 50.

As previously explained, in order to achieve the desired bending of the carrier 50, actuation of the piston 402 within the piston chambers 404 may be precisely controlled. Variables which effect piston 402 movement include actuation pressure supplied to the chambers 404 and friction introduced via movement of the piston in the chamber 404. Thus, it is desirable to reduce operating friction of the piston 402 for precision frictionless actuation. To actuate pistons 402, pressure is developed in a sealed chamber and thus linkage members coupled to pistons 402 and extending through the sealed chamber must be sealed with the chamber, thus, introducing operating friction to the moving pistons 402.

The present invention relates to a "frictionless" piston design where the linkage members coupled to the piston 402 are separated from sealed actuation chambers so that the linkage members do not need to be sealed with the chamber, thus limiting operating friction introduced by the relative movement of the linkage members sealed relative to the piston chamber. One embodiment of the frictionless piston design is shown in FIGS. 12–15. As shown, a dual diaphragm design is used to actuate pistons 402 within chambers 404a–b for relatively frictionless actuation as will be explained.

FIG. 14 is an exploded view illustrating block layers forming manifold 410 and construction of the dual-diaphragm design according to one embodiment of the present invention. Upper-tier pistons 402a operate in upper-tier chambers 404a formed in block layers 414, 416, 418, 420. As shown, block layers 416, 418 include central through openings 472, 474 and opposed transverse recesses 476, 478 which extend from openings 472, 474 to sides of block layers 416, 418. Block layers 416, 418 are stacked to align openings 472, 474 and recesses 476, 478. Recesses 476, 478 form a channel to openings 472, 474. Openings 472, 474 are closed by upper and lower diaphragms 480, 482.

Figure 15A:
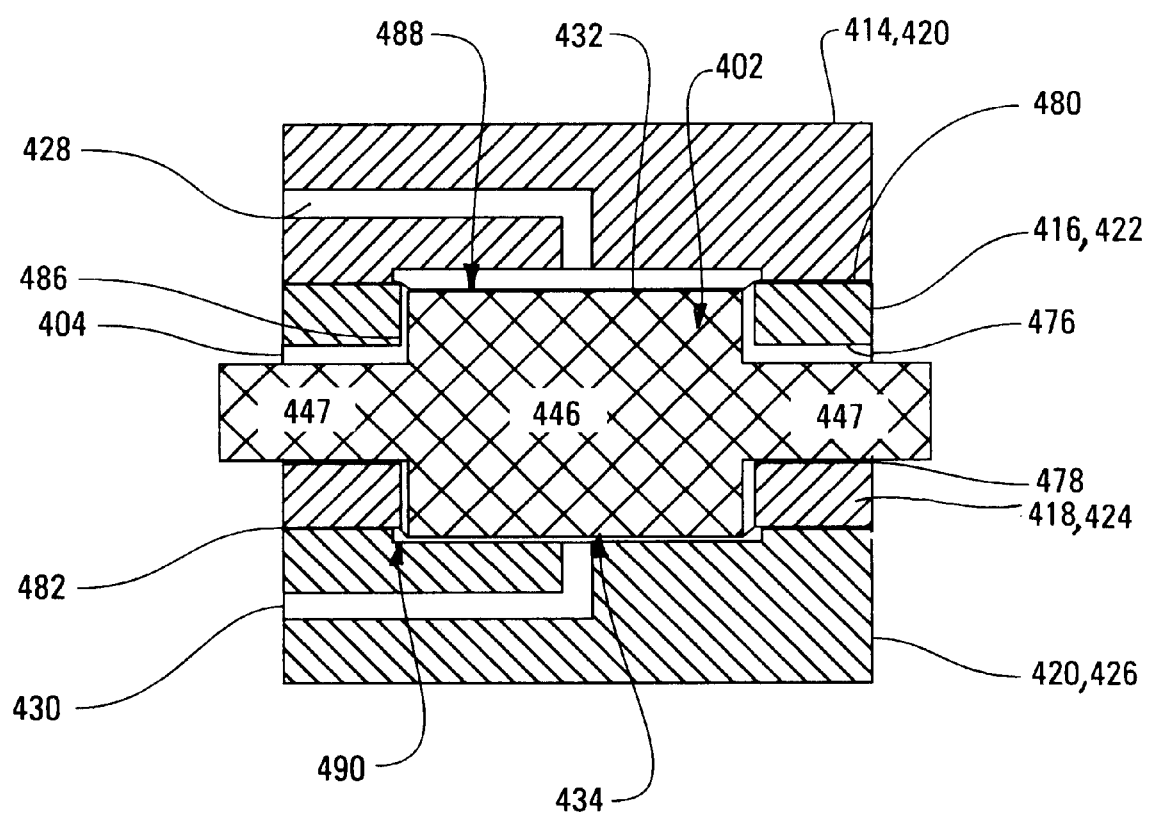
FIGS. 15A–15B illustrate actuation of a piston within a chamber for providing an actuation force to control points along the carrier.
Figure 15B:
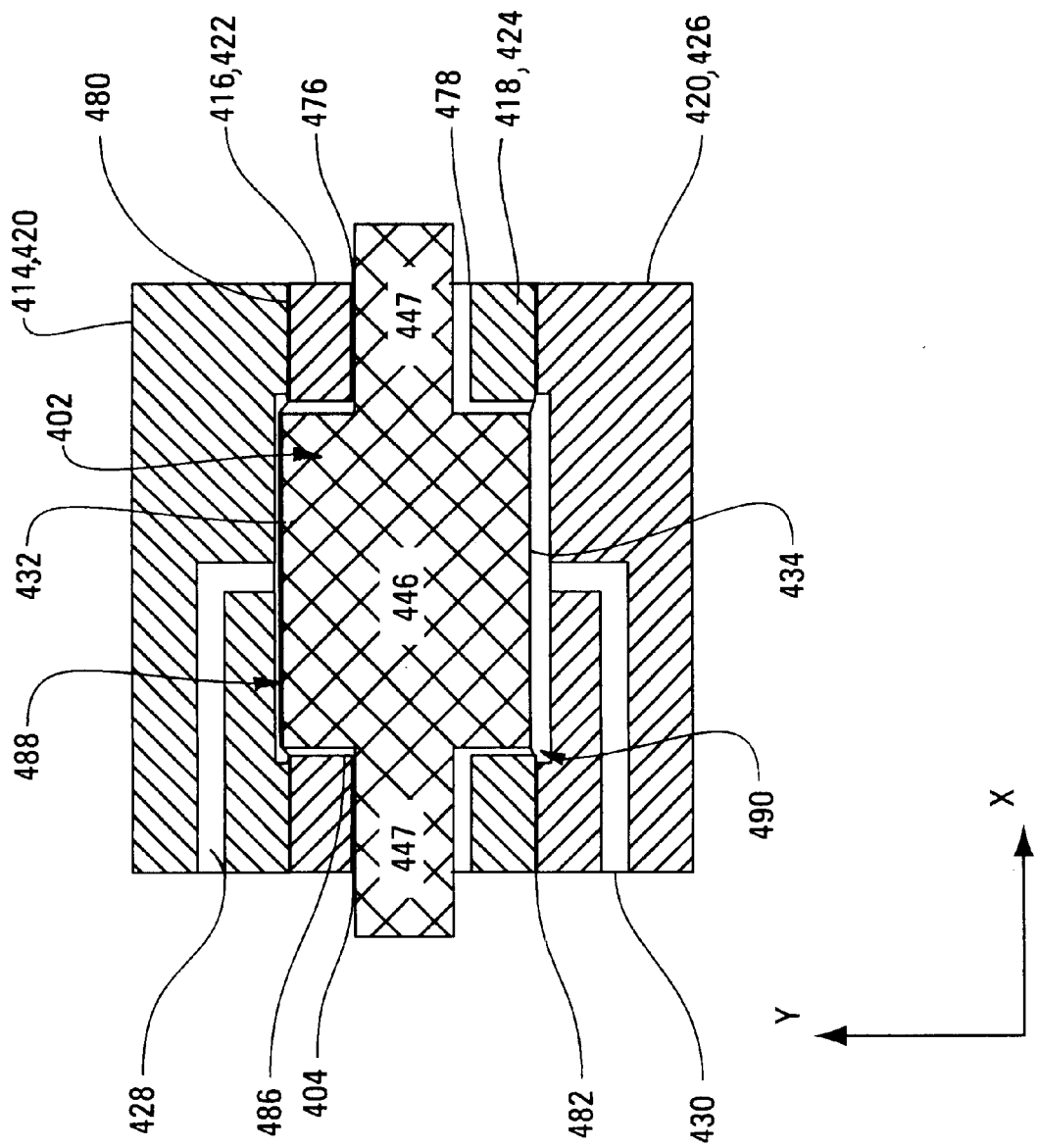

Block layers 414 and 420 include channels 428, 430 which open to recesses 484 (not visible in block layer 414) and ports 409. Block layers 414 and 420 are aligned with diaphragms 480, 482. Thus, when block layers 414–420 and diaphragms 480, 482 are stacked as shown, openings 472, 474 form an operating chamber 486, as illustrated in FIGS. 15A and 15B, closed by diaphragms 480, 482. The main portion 446 of pistons 402 operates in chamber 486 and extensions 447 reciprocate in channels formed by recesses 476, 478. Recesses 484 in block layers 414, 420, closed by diaphragms 480, 482, form bidirectional sealed actuation chambers 488, 490 (shown in FIGS. 15A–15B) which open to channels 428a, 430a, respectively, coupled to the pressure source for bidirectionally actuating pistons 402a.

Lower-tier pistons 402b operate in lower-tier chambers 404b formed in block layers 420, 422, 424, and 426. Lower-tier chambers 404b are formed similar to upper-tier chambers 404a and like numbers are used to identify like parts. In particular, block layer 420 includes lower recesses 484 (not visible in FIG. 14) closed by diaphragm 480 to form sealed actuation chambers 488. Recesses 484 formed in block layer 426 are closed by diaphragm 482 to form actuation chambers 490. Channels 428b and 430b (not visible) formed in block layers 420, 426 (428b not visible in FIG. 14A) are coupled to actuation chambers 488, 490 for selectively supplying actuation pressure for bidirectionally actuating piston 402b.

Figure 14A:
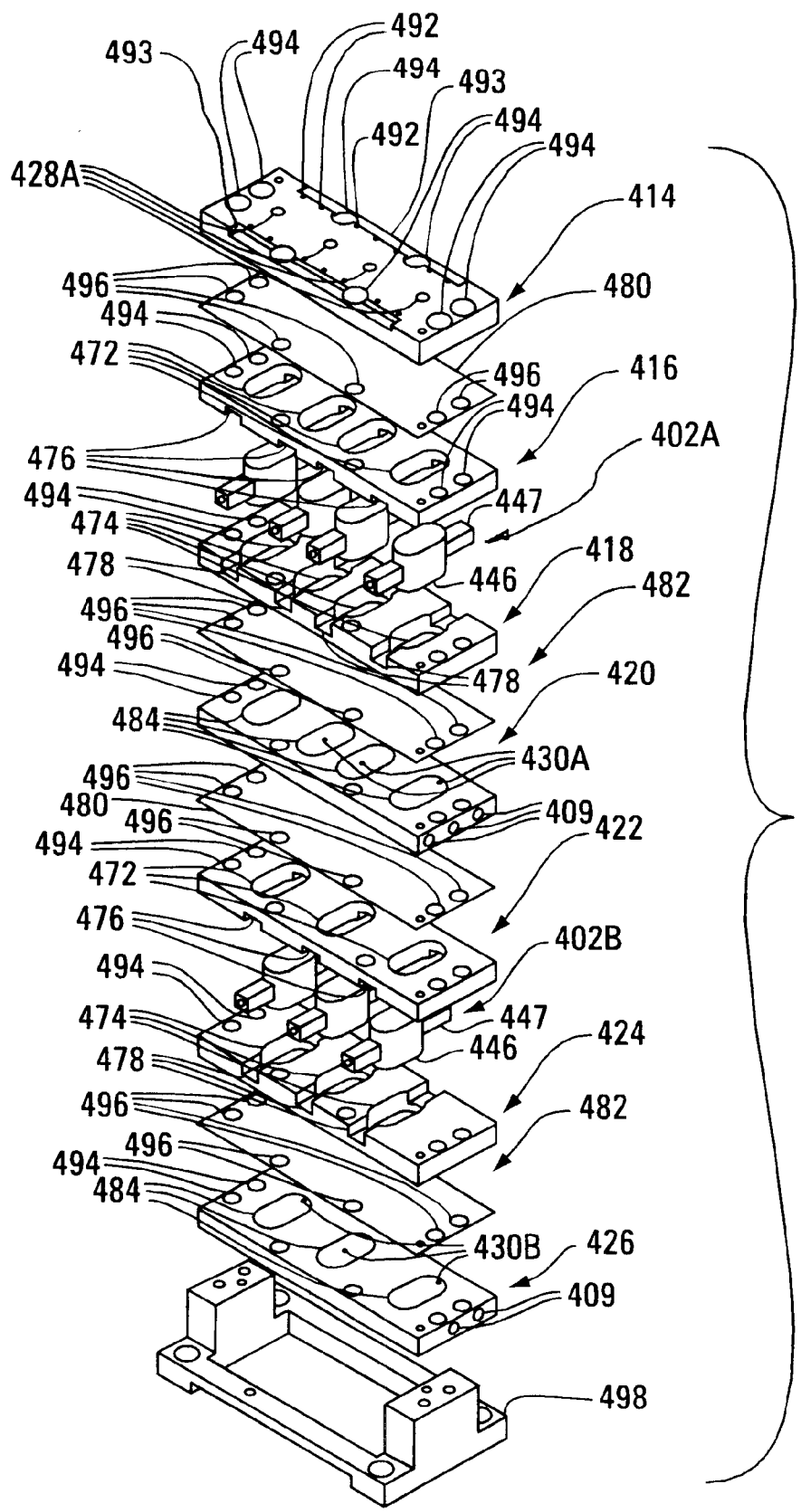
FIG. 14A is an exploded perspective view of block layers and diaphragms forming the actuator manifold.

In the system shown in FIG. 14A, there are four (4) upper-tier pistons 402a and chambers 404a and three (3) lower-tier pistons 402b and chambers 404b. Although a particular number of upper- and lower-tier pistons 402 and chambers 404 are shown, it should be understood that the invention is not limited to any particular number of upper- and lower-tier pistons 402a–b. The pistons 402 are oval shaped to define rounded ends. The oval shape reduces sharp edges or high stress points which improves wear resistance of the diaphragms.

Preferably, the pistons 402 are formed of three separate components (not shown) including an upper oval portion, an elongated rod portion and an oval lower portion. Upper and lower oval portions are joined and the elongated rod portion extends through channels in the upper and lower oval portions to form extensions 447. The upper and lower oval portions cooperatively define the main portion of the piston 446. Springs 450, 454 (not shown in FIG. 14A), coupled to arms 438, 440, coupled to each piston, are secured to block layer 414 via holes 492. Ends of springs 450, 454 fit into elongated stepped portions 493. The multiple block layers are secured via fasteners (not shown) extending through bores 494 of block layers 414, 416, 418, 420, 422, 424, 426 and bores 496 of diaphragms. Layers 414, 416, 418, 420, 422, 424, 426 are coupled to block 498 coupled to base 412.

Figure 14B:
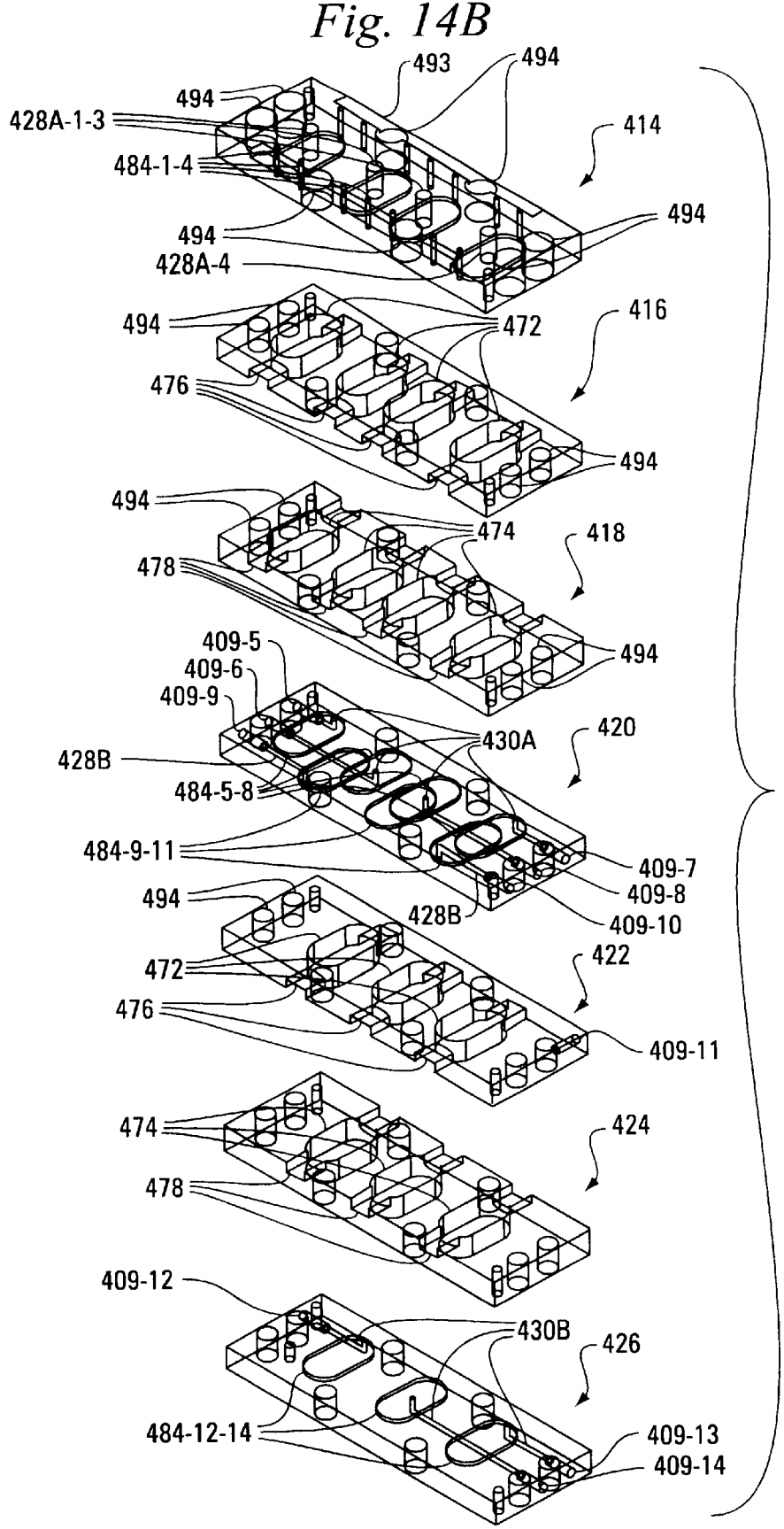
FIG. 14B is an exploded perspective view of block layers illustrating port connections to actuation chambers.

Channels 428a–b, 430a–b are coupled to ports 409, coupled to pressure source 406, for actuating upper- and lower-tier pistons 402a–b via pressure supplied to actuation chambers 488, 490. FIG. 14B is a detailed exploded view of channels 428a–b and 430a–b, formed in block layers 414, 420, 422, 424. Diaphragms 480, 482 are not shown in FIG. 14B, nor are pistons 402. As shown, block layer 414 includes four channels 428a-1–428a-4, coupled to ports 409-1–409-4; and four recesses 484-1–484-4, which form upper-tier actuation chambers 488 when closed by diaphragm 480. Block layer 420 includes recesses 484-5–484-8, closed by diaphragm 482 to form opposed upper-tier actuation chambers 490; channels 430a-1–430a-4 are formed in block layer 420 and coupled to ports 409-5–409-8 for actuation pressure; and recesses 484-5–494-8, forming actuation chambers 490. Block layer 420 includes three lower recesses 484-9–484-11, closed by diaphragm 480 to form lower-tier actuation chambers 488. Channels 428b are coupled to ports 409-10, 409-11, formed on block layers 420 and 422 and coupled to recesses 484-9–484-11 to supply pressure to lower-tier actuation chambers 488. As shown, port 409-11 is formed in block 422 and extends across a gap between block layers 420, 422 to couple to recess 484-10 to supply actuation pressure. Block layer 426 includes recesses 484-12–484-14, coupled to channels 430b and closed by diaphragm 482 to form lower-tier actuation chambers 490. Channels 430b are coupled to ports 409-13–409-15, formed on block layer 426 for actuation pressure.

As comparatively illustrated in FIGS. 15A–B, piston 402 is moved (raised and lowered along the y-axis) within the operated chamber 486 by supplying a pressure differential to actuation chambers 488, 490 via channels 428, 430. In particular, as illustrated in FIG. 15A, pressure supplied to actuation chambers 488 moves diaphragm 480 towards piston actuation surface 432 to lower piston 402 and as illustrated in FIG. 15B, pressure supplied to actuation chambers 490 moves diaphragm 482 towards piston actuation surface 434 to raise piston 402 for bidirectional actuation.

The dual diaphragm design provides separate sealed bidirectional operating or actuation chambers. Piston operates outside of the sealed chambers and is linked to rods (linkage members) 400 via components supported outside the sealed actuation chambers so that the piston is not sealed relative to the actuation chambers which impedes movement of the piston via contact of the piston relative to the sealed actuation chambers. In particular, since actuation pressure develops in separate sealed opposed actuation chambers 488, 490, designed for bidirectionally actuating piston, piston extensions 447 coupled to rods 400 are not tightly sealed relative to manifold 410 and thus, movement of pistons 402 is not affected by friction which may degrade the actuated profile of the carrier 50 (i.e. by influencing the y-axis deflection of the rods 400).

As explained, pistons 402 are bidirectionally actuated via cooperation of actuation chambers 488, 490 and actuating surfaces 432, 434. Each opposed actuating surface 432, 434 has the same effective actuation surface area, since piston is coupled to rod 400 via extensions 447 extending from opposed sides of main portion 446 perpendicular to the actuation surfaces 432, 434. The similarly sized actuation surfaces 432, 434 provide a simpler system for controlling the magnitude of displacement or stroke of the piston 402 since the net force output to the piston is linear over the stroke of the piston 402.

Figure 16:
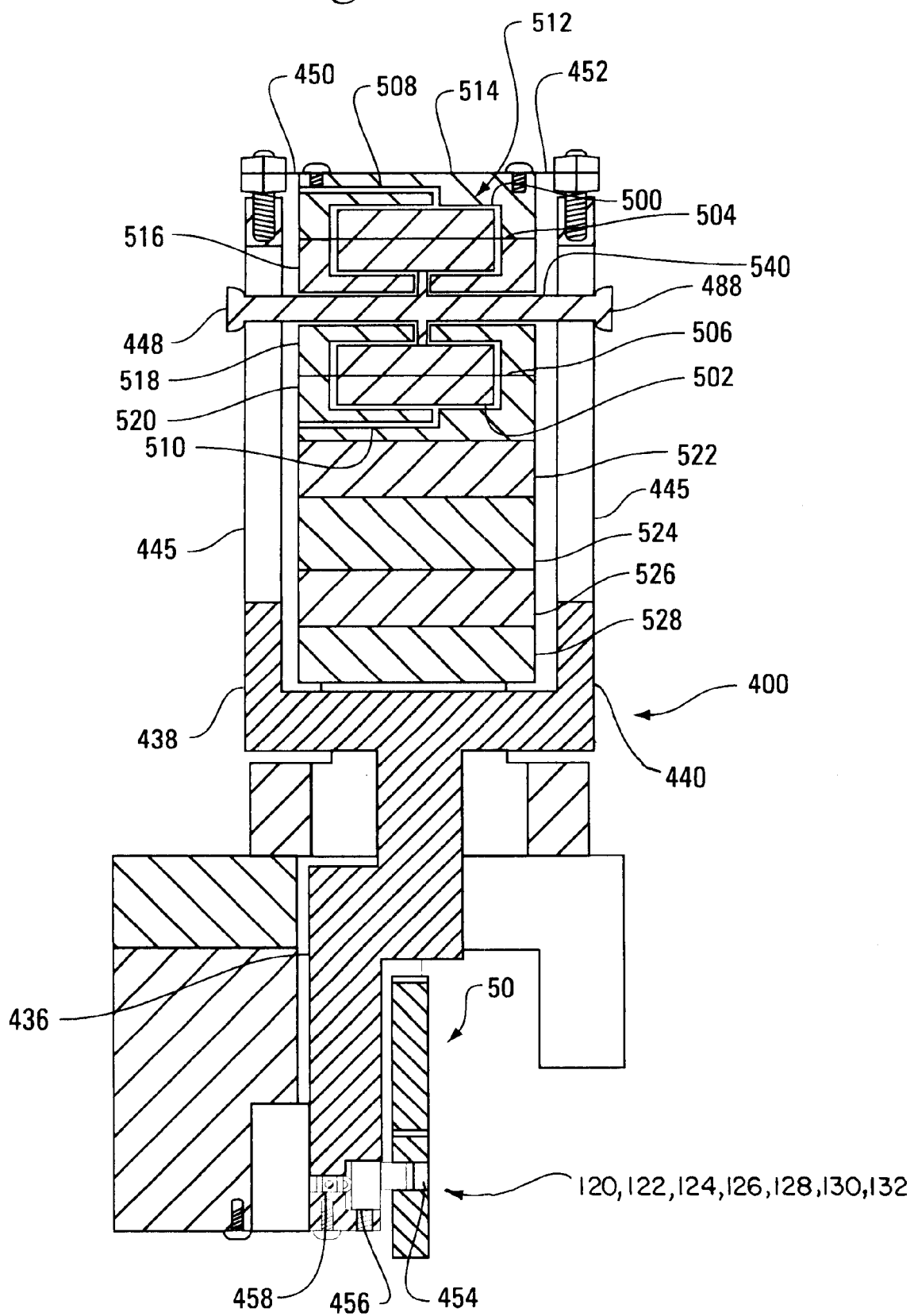
FIG. 16 is a cross-sectional view of an alternate embodiment of an actuator manifold illustrating an upper-tier actuation assembly.
Figure 17:
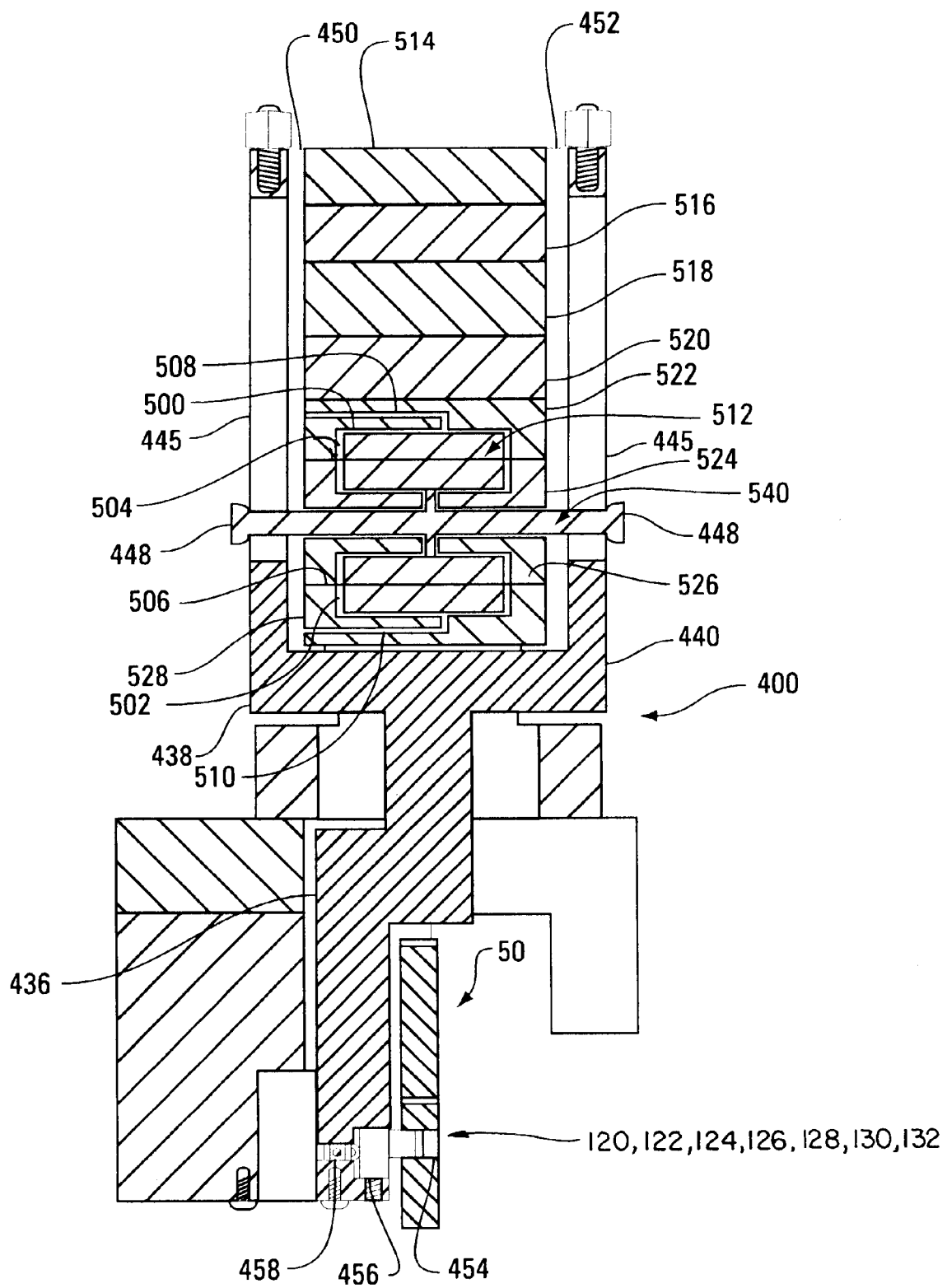
FIG. 17 is a cross-sectional view of an alternate embodiment of an actuator manifold illustrating a lower-tier actuation assembly.
Figure 18:
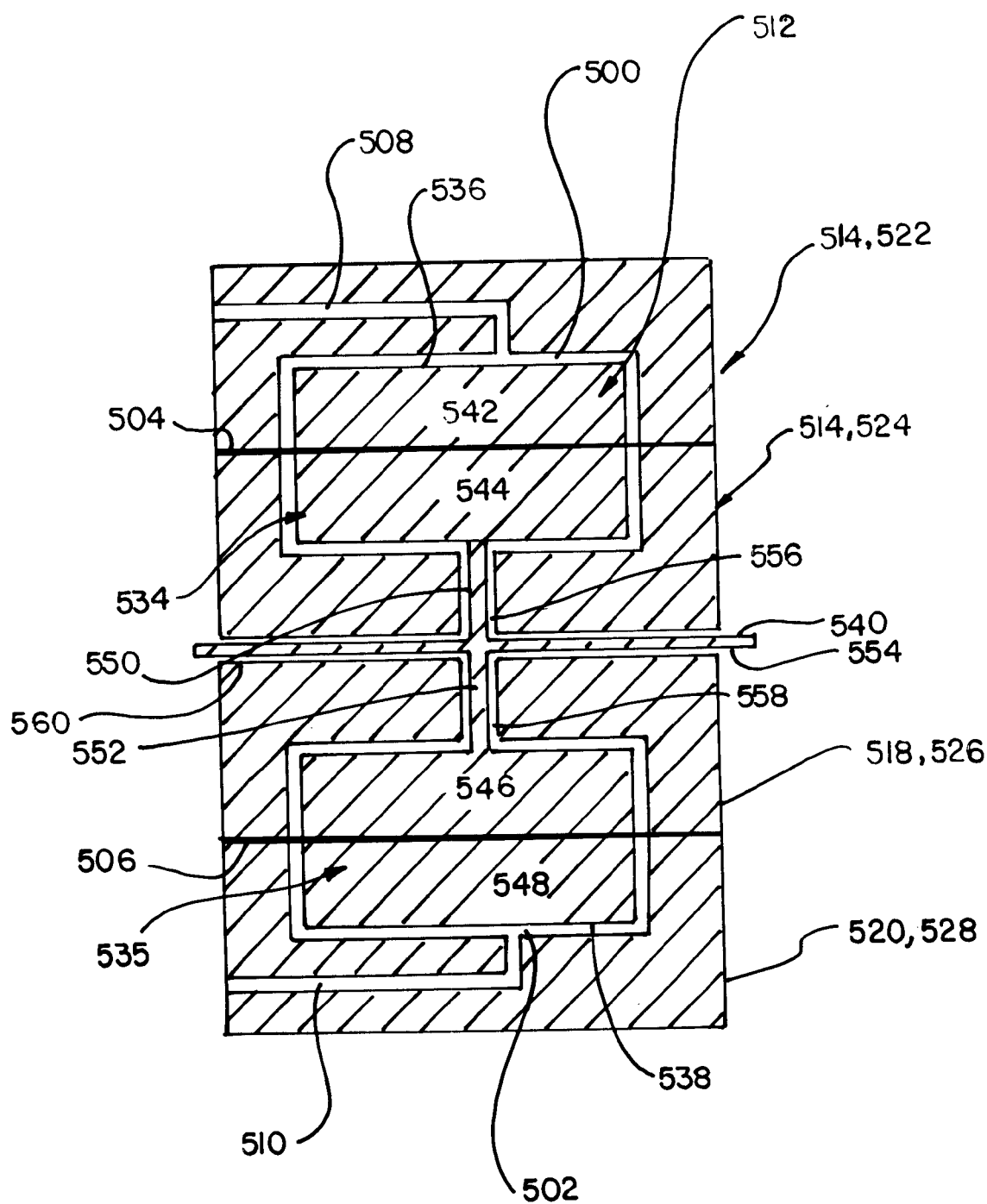
FIG. 18 is a detailed cross-sectional view of an actuation assembly illustrated in FIGS. 16–17.

FIGS. 16–18 illustrate another embodiment of a "frictionless" piston design incorporating a dual diaphragm design. Like numbers are used to identify like parts of the actuation system illustrated in FIGS. 12–15. Similar to the actuation system illustrated in FIGS. 12–15, the actuation system of FIGS. 16–18 includes opposed separate sealed actuation chambers 500, 502 formed via diaphragms 504, 506, coupled to channels 508, 510 to selectively supply actuation pressure to raise and lower an actuation member 512 (or piston) as will be explained.

The actuation design is formed in block layers 514, 516, 518, 520, 522, 524, 526, and 528. Upper-tier actuators are formed in layers 514, 516, 518, 520 as shown in FIG. 16 and lower-tier actuators are formed in layers 522, 524, 526 and 528 as shown in FIG. 17. The design is formed in layers 514–528 for ease of manufacture and construction of the actuation design of the present invention is not limited to the specific embodiment shown.

FIG. 18 is a detailed view of the construction of the upper- and lower-tier actuators of FIGS. 16–17 illustrated in a center piston position. The construction of the upper-tier actuators in layers 514, 516, 518, 520 is the same as the construction of the lower-tier actuators in layers 522, 524, 526, 528; and, thus, only a single-tier actuator layer structure is shown. Sealed chambers 500, 502 are formed in a central cavity of blocks 514, 522 and 520, 528 which is opened to channels 508, 510. Chambers 500, 502 are sealed via diaphragms 504, 506. The actuator assembly 512 includes upper and lower piston blocks 534, 535. The upper and lower piston blocks 534, 535 include actuation surfaces 536, 538. Pressure is supplied to actuation surface 536 via channel 508 to lower piston assembly 512 and supplied to actuation surface 538 via channel 510 to raise piston assembly 512 for bidirectional actuation or translational movement. Translational motion of the piston assembly 512 is transferred to the rods 400 as illustrated in FIGS. 16–17 via piston linkage 540.

As shown in FIG. 18, piston blocks 534, 535 are formed of block segments 542, 544, 546, 548. Block segments 542, 544 operate in block layers 514, 522 and 516, 524 cavities; and block segments 546, 548 operate in block layers 518, 528 and 520, 528 cavities. Piston block segments 542, 544, and 546, 548 are frictionlessly supported via diaphragms 504, 506, coupled to and supported between blocks 514, 522, and 516, 524; and 518, 526 and 520, 528; and thus are movable therewith via pressure supplied to pressure actuation chambers 500, 502.

Linkage 540 is coupled to piston block segments 544 and 546 to link the translational motion of the actuator assembly 512 to the rods 400 for actuating the carrier 50. Linkage 540 includes piston block rods 550, 552 and transverse rod 554. Block rods 550, 552 are coupled to block segments 544, 546 and extend through channels 556, 558 in layers 516, 524 and 518, 526. Block rods 550, 552 are coupled to transverse rod 554 which extends through channel 560 cooperatively formed via recessed channels formed in layers 516, 524 and 518, 526. Thus, movement of the block rods 550, 552, via piston blocks 534 and 536 is transferred to transverse rod 554 which is operatively coupled to rods 400 to actuate the carrier 50 as described.

As described and illustrated, bidirectional actuation is achieved via actuation of block segments 542 and 548 operating sealed actuation chambers closed by diaphragms 504, 506. Since block segments 544 and 546 are coupled to diaphragms 504, 506, these segments move with actuated block segments 542 and 548. Linkage 540 is coupled to block segments 544, 546 which operate outside the sealed actuation chambers 500, 502 and thus linkage 540 (i.e. block rods 550, 552 and transverse rod 554) are not sealed to provide a sealed actuation chamber and thus, the piston assembly 512 essentially operates friction free relative to the manifold as described to provide precision actuation.

The displacement of the carrier 50 via actuators 220, 222, 224, 226, 228, 230, 232 depends upon the displacement of rods 400 which is related to the stroke of the pistons 402. The clearance between the piston (and linkage) and chamber portions defines the stroke of the piston which is preferably approximately 0.06 inches (plus/minus 0.03 inches) Preferably, the air pressure supplied to actuate piston 402 along the stroke is 200 psi. The area of the actuation surfaces 432, 434 preferably is 0.25 inches squared. Preferably, the diaphragms are formed of a fabric-reinforced woven nylon or similar flexible material. Preferably, pressure is selectively supplied to actuation chambers via three-way directional valves. Although the lapping system of the present invention is described with reference to lapping heads of a magnetic type disc drive data storage system, it should be understood that the invention is not so limited and can be used for constructing optical data storage systems and other devices requiring precision lapping control. Additionally it should be understood that the frictionless actuation system described may be used for other applications and is not limited to the applications shown.

Although the present invention has been described with reference to preferred embodiments, workers skilled in the art will recognize that changes may be made in form and detail without departing from the spirit and scope of the invention.

What is claimed is:

1. An actuator adapted to adjust a profile of a carrier supporting a bar for lapping comprising:
   a base adapted to support the carrier having a mounting surface adapted to support the bar for lapping;
   a manifold operably coupled to the base, said manifold including a plurality of spaced staggered chambers having actuation members operable therein, said manifold including channels coupled to each of the spaced staggered chambers, and adapted to couple to a pressure supply to operate said actuation members in said chambers; and
   linkage members operably coupled to said actuation members and said carrier, and movable along an actuation axis for adjusting the profile of said carrier via operation of said actuation members within the chambers.

2. The actuator of claim 1 wherein the actuation members include pistons operable in the chambers and the manifold is located relative to the carrier supported by the base so that the pistons operating in the spaced staggered chambers are in center alignment with respect to said carrier.

3. The actuator of claim 2 wherein the linkage members include a yoke-shaped member having a stem adapted to couple to the carrier and spaced opposed arms coupled to the stem and adapted to couple to opposed sides of the pistons.

4. The actuator of claim 3 wherein the arms are coupled to the manifold via a spring to limit transverse movement of the actuation member relative to the actuation axis.

5. The actuator of claim 2 wherein said pistons include opposed operating surfaces for actuating the pistons and said opposed operating surfaces have similar actuation surface area.

6. The actuator of claim 1 wherein the chambers formed in the manifold are spaced to align with control points of the carrier.

7. The actuator of claim 6 wherein the spacing between chambers is non-uniform.

8. The actuator of claim 1 wherein the actuation members include a piston said piston being frictionlessly supported relative to said manifold and including separate sealed opposed actuation chambers coupled to the pressure supply and operably coupled to the piston to bidirectionally actuate the piston.

9. The actuator of claim 8 wherein the piston includes a portion moveable within a chamber separate from the sealed opposed actuation chambers, and the linkage member is operably coupled to the portion of the piston in the chamber separate from the sealed actuation chambers.

10. The actuator of claim 1 wherein the actuation members include a flexible diaphragm operably coupled to a pressure supply channel for moving the diaphragm, and operably coupled to said linkage members for adjusting the profile of the carrier.

11. The actuator of claim 10 including a plurality of diaphragms coupled to a plurality of pressure supply channels to provide bidirectional actuation.

12. The actuator of claim 11 including a piston operably coupled to the diaphragms and the linkage member to adjust the profile of the carrier.

13. An actuator manifold assembly adapted to supply actuation force at selected spaced locations comprising:
   a plurality of actuation members; and
   a manifold including a plurality of spaced, staggered chambers having the plurality of actuation members operable therein.

14. The actuator manifold assembly of claim 13 wherein the actuation members include a piston frictionlessly supported relative to said manifold and including sealed opposed actuation chambers coupled to a pressure supply and operably coupled to the piston, said piston having a portion movable in a separate chamber external to the actuation chambers.

15. The actuator manifold assembly of claim 13 wherein the actuation members include a piston and including a flexible diaphragm coupled to a pressure supply channel for moving the diaphragm, said piston being operably coupled to the diaphragm for operation.

16. The actuator manifold assembly of claim 15 including a plurality of diaphragms coupled to a plurality of pressure supply channels to provide bidirectional actuation.

17. The actuator manifold assembly of claim 13 wherein the chambers formed in the manifold are spaced to align with control points of a carrier.

18. The actuator manifold assembly of claim 17 wherein the spacing between the chambers is non-uniform.

19. A lapping device comprising:
   a lapping surface;
   a carrier to support a bar relative to the lapping surface;
   support member to support the carrier relative to the lapping surface;
   an actuator device to adjust a profile of the carrier, said actuator device including:
      actuator members operably coupled to the carrier; and
      a bidirectional driver operably coupled to the actuator members for bidirectionally moving the actuator members to adjust the profile of the carrier.

20. The lapping device of claim 19 wherein the driver includes:

a pressure source;

a valve assembly operably coupled to the actuation members and the pressure source; and a controller coupled to the valve assembly to selectively supply actuation pressure to the actuation members.

21. A lapping device comprising:

a lapping surface;

a carrier to support a bar relative to the lapping surface;

support member to support the carrier relative to the lapping surface;

an actuator device for adjusting a profile of the carrier, said actuator device including:
    a diaphragm operably coupled to a pressure source for bidirectional actuation;
    a vertical armature extending in vertical alignment relative to the lapping surface, operably coupled to the carrier and the diaphragm for adjusting the profile of the carrier; and
    means for operably coupling the vertical armature to the diaphragm to adjust the profile of the carrier.

22. The lapping device of claim 21 including a plurality of diaphragms forming separate actuation chambers.

23. The lapping device of claim 21 wherein the vertical armature includes a center stem and opposed spaced arms, said diaphragm being operably coupled to the opposed spaced arms for actuation thereby.

24. An actuator device comprising:

a base;

an actuation member operably coupled to the base; and sealed opposed actuation chambers formed in the base, the actuation chambers being coupled to a pressure supply and operably coupled to the actuation member for bidirectional actuation, said actuation member having a portion located in a chamber separate from the sealed actuation chambers for coupling the actuation member to transmit actuation force.

25. The actuator device of claim 24 including dual flexible diaphragms forming the sealed actuation chambers.

26. A method for lapping a surface comprising:

providing a lapping device having a carrier supported relative to a lapping surface;

providing an actuation system coupled to the carrier, said actuation system including a plurality of spaced actuators, said actuators being coupled to a pressure source for bidirectional actuation;

coupling a bar for lapping to the carrier;

supplying pressure to the actuators to operate the actuators for desired bending of the carrier; and lapping the bar to a desired lapped profile.

27. The method of claim 26 comprising the steps of providing the actuators having sealed opposed actuation chambers coupled to the pressure source, said actuation chambers being operably coupled to an actuation member having a portion external to the sealed actuation chambers adapted to coupled to the carrier to transmit actuation force; and selectively supplying actuation pressure to the sealed actuation chambers for moving the actuation member.

\* \* \* \* \*